United States Patent
Wallace et al.

(10) Patent No.: US 10,371,406 B2
(45) Date of Patent: Aug. 6, 2019

(54) MAINTENANCE AND DIAGNOSTICS FOR REFRIGERATION SYSTEMS

(71) Applicant: Emerson Climate Technologies Retail Solutions, Inc., Kennesaw, GA (US)

(72) Inventors: John Wallace, Acworth, GA (US); Franklin Beltran, Acworth, GA (US); Frank S. Wallis, Sidney, OH (US); Paul L. Fullenkamp, Versailles, OH (US); Karen Richard, Versailles, OH (US)

(73) Assignee: Emerson Climate Technologies Retail Solutions, Inc., Kennesaw, GA (US)

( * ) Notice: Subject to any disclaimer, the term of this patent is extended or adjusted under 35 U.S.C. 154(b) by 0 days.

(21) Appl. No.: 15/819,742

(22) Filed: Nov. 21, 2017

(65) Prior Publication Data

US 2018/0094829 A1 Apr. 5, 2018

Related U.S. Application Data

(63) Continuation of application No. 15/197,169, filed on Jun. 29, 2016.
(Continued)

(51) Int. Cl.
*F25B 5/02* (2006.01)
*F24F 11/62* (2018.01)
(Continued)

(52) U.S. Cl.
CPC ............. *F24F 11/62* (2018.01); *F24F 11/30* (2018.01); *F24F 11/63* (2018.01); *F24F 11/64* (2018.01);
(Continued)

(58) Field of Classification Search
None
See application file for complete search history.

(56) References Cited

U.S. PATENT DOCUMENTS

| 4,484,452 A | 11/1984 | Houser, Jr. |
| 4,829,779 A * | 5/1989 | Munson ................. F25D 29/00 62/175 |

(Continued)

FOREIGN PATENT DOCUMENTS

| JP | H1089744 A | 4/1998 |
| JP | 2005090787 A | 4/2005 |

(Continued)

OTHER PUBLICATIONS

Written Opinion of the International Searching Authority regarding International Application No. PCT/US2016/040468, dated Oct. 25, 2016.

(Continued)

*Primary Examiner* — Carlos R Ortiz Rodriguez
(74) *Attorney, Agent, or Firm* — Harness, Dickey & Pierce, P.L.C.

(57) ABSTRACT

A system and a method are provided including a controller for a refrigeration or HVAC system having a compressor rack with at least one compressor. The controller communicates with a tracking module configured to diagnose health of a compressor in the compressor rack. In response to rated performance data for the compressor being unavailable, the tracking module is configured to generate baseline data for the compressor and to diagnose health of the compressor by comparing operational data of the compressor to the baseline data for the compressor. In response to the rated performance data for the compressor being available, the tracking module is configured to diagnose health of the compressor
(Continued)

by comparing the operational data of the compressor to the rated performance data for the compressor.

14 Claims, 17 Drawing Sheets

Related U.S. Application Data

(60) Provisional application No. 62/186,813, filed on Jun. 30, 2015.

(51) Int. Cl.
| | |
|---|---|
| *F25B 49/02* | (2006.01) |
| *F25B 49/00* | (2006.01) |
| *F24F 11/64* | (2018.01) |
| *F24F 11/89* | (2018.01) |
| *F24F 11/30* | (2018.01) |
| *F25D 29/00* | (2006.01) |
| *G05B 19/048* | (2006.01) |
| *G05B 23/02* | (2006.01) |
| *F24F 11/63* | (2018.01) |
| *F24F 11/32* | (2018.01) |
| *F24F 140/60* | (2018.01) |
| *F24F 11/46* | (2018.01) |

(52) U.S. Cl.
CPC .............. *F24F 11/89* (2018.01); *F25B 5/02* (2013.01); *F25B 49/005* (2013.01); *F25B 49/022* (2013.01); *F25D 29/00* (2013.01); *G05B 19/048* (2013.01); *G05B 23/0218* (2013.01); *G05B 23/0262* (2013.01); *G05B 23/0283* (2013.01); *F24F 11/32* (2018.01); *F24F 11/46* (2018.01); *F24F 2140/60* (2018.01); *F25B 2400/075* (2013.01); *F25B 2500/28* (2013.01); *F25B 2600/0251* (2013.01); *F25B 2700/15* (2013.01); *F25B 2700/195* (2013.01); *F25B 2700/1931* (2013.01); *F25B 2700/1933* (2013.01); *F25B 2700/2104* (2013.01); *F25B 2700/2116* (2013.01); *F25B 2700/2117* (2013.01); *F25B 2700/21151* (2013.01); *F25B 2700/21152* (2013.01); *G05B 2219/2614* (2013.01)

(56) References Cited

U.S. PATENT DOCUMENTS

| | | | |
|---|---|---|---|
| 6,155,062 A | 12/2000 | Santarnecchi | |
| 6,318,101 B1 | 11/2001 | Pham et al. | |
| 6,321,543 B1 | 11/2001 | Said et al. | |
| 6,578,373 B1 | 6/2003 | Barbier | |
| 6,711,911 B1 | 3/2004 | Grabon et al. | |
| 7,752,854 B2 | 7/2010 | Singh et al. | |
| 7,845,179 B2 | 12/2010 | Singh et al. | |
| 9,194,393 B2 | 11/2015 | Pham | |
| 2003/0037555 A1 | 2/2003 | Street et al. | |
| 2005/0235664 A1 | 10/2005 | Pham | |
| 2006/0117766 A1 | 6/2006 | Singh et al. | |
| 2006/0130501 A1 | 6/2006 | Singh et al. | |
| 2007/0089440 A1 | 4/2007 | Singh et al. | |
| 2009/0077983 A1 | 3/2009 | Singh et al. | |
| 2009/0225479 A1 | 9/2009 | Jayanth et al. | |
| 2010/0138190 A1 | 6/2010 | McConnell et al. | |
| 2010/0175400 A1 | 7/2010 | Kasahara | |
| 2010/0179703 A1 | 7/2010 | Singh et al. | |
| 2010/0212343 A1 | 8/2010 | Swofford et al. | |
| 2011/0167852 A1 | 7/2011 | Kawaai | |
| 2011/0238232 A1 | 9/2011 | Tomita et al. | |
| 2012/0060529 A1 | 3/2012 | Singh et al. | |
| 2012/0227427 A1 | 9/2012 | Liu et al. | |
| 2013/0055742 A1 | 3/2013 | Ouchi et al. | |
| 2013/0272840 A1 | 10/2013 | Fujioka et al. | |
| 2014/0033746 A1 | 2/2014 | McSweeney | |
| 2014/0208785 A1 | 7/2014 | Wallace et al. | |
| 2014/0262134 A1 | 9/2014 | Arensmeier et al. | |
| 2015/0032583 A1 | 1/2015 | Mello et al. | |
| 2017/0089598 A1 | 3/2017 | Wallace et al. | |
| 2017/0089625 A1 | 3/2017 | Wallace et al. | |

FOREIGN PATENT DOCUMENTS

| | | | |
|---|---|---|---|
| JP | 2011259656 A | 12/2011 | |
| KR | 20100036345 A | 4/2010 | |
| WO | WO-2008010988 A1 | 1/2008 | |
| WO | WO-2014149174 A1 | 9/2014 | |

OTHER PUBLICATIONS

International Search Report regarding International Application No. PCT/US2016/040468, dated Oct. 25, 2016.
International Search Report regarding International Application No. PCT/US2017/056771 dated Jan. 19, 2018.
Written Opinion of the International Searching Authority regarding International Application No. PCT/US2017/056771 dated Jan. 19, 2018.
International Search Report regarding International Application No. PCT/US2016/040488, dated Oct. 18, 2016.
Written Opinion of the International Searching Authority regarding International Application No. PCT/US2016/040488, dated Oct. 18, 2016.
Non-Final Office Action regarding U.S. Appl. No. 15/197,121 dated Jun. 1, 2018.
Notice of Allowance regarding U.S. Appl. No. 15/197,121 dated Nov. 15, 2018.

* cited by examiner

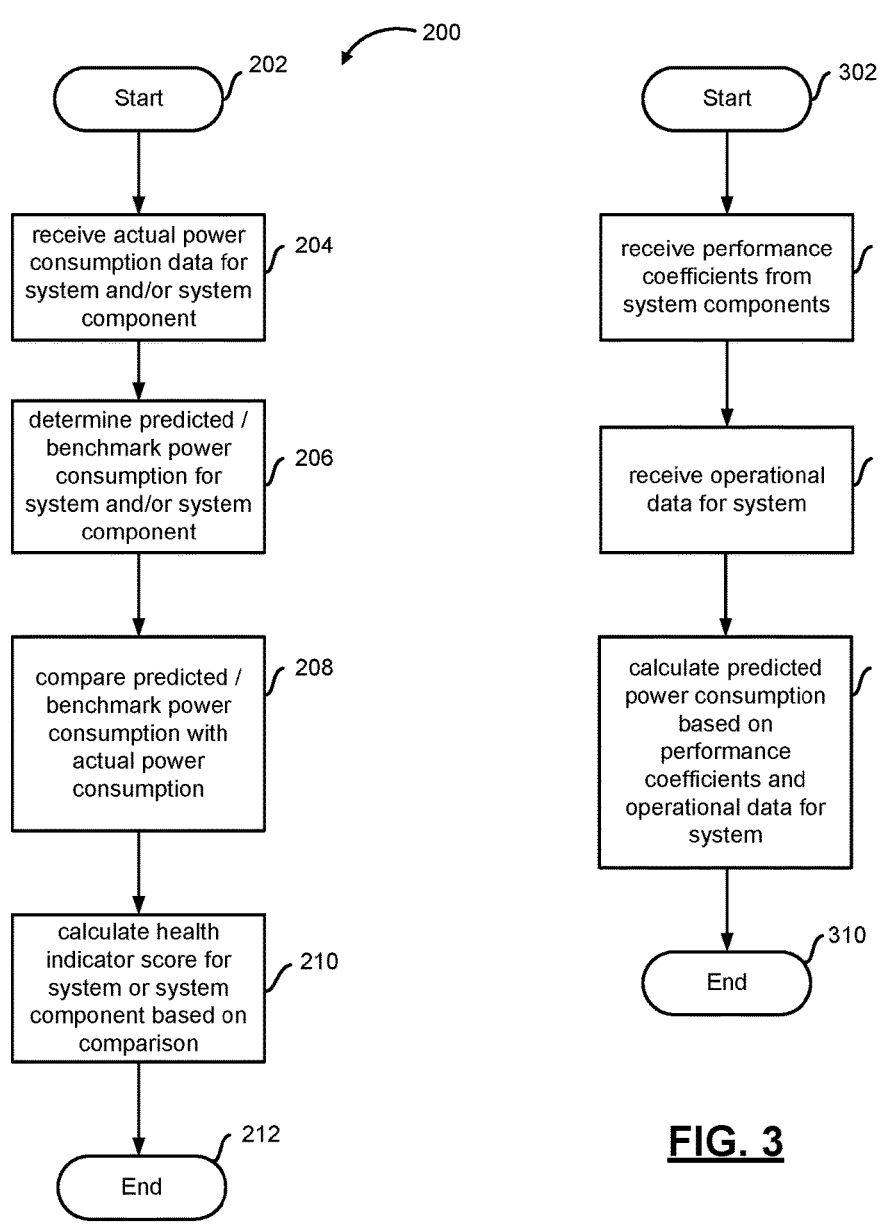

MAINTENANCE AND DIAGNOSTICS FOR REFRIGERATION SYSTEMS

CROSS-REFERENCE TO RELATED APPLICATIONS

This application is a continuation of U.S. patent application Ser. No. 15/197,169, filed on Jun. 29, 2016, which claims the benefit of U.S. Provisional Application No. 62/186,813, filed on Jun. 30, 2015. The entire disclosures of the applications referenced above are incorporated herein by reference.

FIELD

The present disclosure relates to refrigeration systems and, more particularly, to maintenance and diagnostics for refrigeration systems.

BACKGROUND

The background description provided herein is for the purpose of generally presenting the context of the disclosure. Work of the presently named inventor(s), to the extent it is described in this background section, as well as aspects of the description that may not otherwise qualify as prior art at the time of filing, are neither expressly nor impliedly admitted as prior art against the present disclosure.

Refrigeration systems are an essential part of many commercial building and dwellings. For example, food retailers may rely on refrigeration systems to ensure the quality and safety of food products. Many other businesses may have products or materials that must be refrigerated or maintained at a lowered temperature. HVAC systems allow people to remain comfortable where they shop, work or live.

Refrigeration system operation, however, can represent a significant portion of a business' operating costs. As such, it may be beneficial for refrigeration system users to closely monitor the performance and energy consumption of the refrigeration systems to detect and diagnose any performance issues so that maintenance can be performed to maximize efficiency and reduce operational costs. Generally speaking, users may lack the expertise to accurately analyze system performance and detect and diagnose any performance issues.

SUMMARY

This section provides a general summary of the disclosure, and is not a comprehensive disclosure of its full scope or all of its features.

A system is provided and includes a system controller for a refrigeration or HVAC system having a compressor rack with at least one compressor and a condensing unit with at least one condenser fan, the system controller monitoring operation of the refrigeration or HVAC system. A rack controller is in communication with the system controller, the rack controller monitoring and controlling operation of the compressor rack and determining compressor rack power consumption data. A condensing unit controller in communication with the system controller, the condensing unit controller monitoring and controlling operation of the condensing unit and determining condensing unit power consumption data. The system controller receives the compressor rack power consumption data and the condensing unit power consumption data, determines a total power consumption of the refrigeration or HVAC system based on the compressor rack power consumption data and the condensing unit power consumption data, determines at least one of a predicted power consumption and a benchmark power consumption for the refrigeration system, compares the total power consumption with at least one of the predicted power consumption and the benchmark power consumption, and generates a health indicator score based on the comparison.

In other features, the system controller can receive performance coefficients for the refrigeration or HVAC system and determine the predicted power consumption based on the performance coefficients and on operational data for the refrigeration or HVAC system.

In other features, the system controller can monitor power consumption data of the refrigeration or HVAC system over an initialization period and determined the benchmark power consumption based on the monitored power consumption data for the initialization period.

A method is provided and includes monitoring, with a system controller, operation of a refrigeration or HVAC system having a compressor rack with at least one compressor and a condensing unit with at least one condenser fan. The method also includes monitoring and controller, with a rack controller in communication with the system controller, operation of the compressor. The method also includes determining, with the rack controller, compressor rack power consumption data for the compressor rack. The method also includes monitoring and controller, with a condensing unit controller in communication with the system controller, operation of the condensing unit. The method also includes determining, with the condensing unit controller, power consumption data for the condensing unit. The method also includes receiving, with the system controller, the compressor rack power consumption data and the condensing unit power consumption data. The method also includes determining, with the system controller, a total power consumption of the refrigeration or HVAC system based on the compressor rack power consumption data and the condensing unit power consumption data. The method also includes determining, with the system controller, at least one of a predicted power consumption and a benchmark power consumption for the refrigeration system. The method also includes comparing, with the system controller, the total power consumption with at least one of the predicted power consumption and the benchmark power consumption. The method also includes generating, with the system controller, a health indicator score based on the comparison.

In other features, the method also includes receiving, with the system controller, performance coefficients for the refrigeration or HVAC system and determining, with the system controller, the predicted power consumption based on the performance coefficients and on operational data for the refrigeration or HVAC system.

In other features, the method also includes monitoring, with the system controller, power consumption data of the refrigeration or HVAC system over an initialization period and determining, with the system controller, the benchmark power consumption based on the monitored power consumption data for the initialization period.

Another system is provided and includes a system controller for a refrigeration or HVAC system having a compressor rack with at least one compressor, the system controller monitoring and controlling operation of the refrigeration or HVAC system. A rack controller is in communication with the system controller, the rack controller monitoring and controlling operation of the compressor rack. The system controller determines a flood-back discharge temperature corresponding to a flood-back condition, receives an actual discharge temperature associated with the compressor rack, compares the actual discharge temperature with the flood-back discharge temperature, and generates a notification to the rack controller based on the comparison.

In other features, the system controller generates the notification when a difference between the flood-back discharge temperature and the actual discharge temperature is less than a predetermined threshold.

In other features, the rack controller implements a bump start operation after receiving the notification.

In other features, the rack controller activates crank case heaters after receiving the notification.

Another method is provided and includes monitoring and controlling, with a system controller, a refrigeration or HVAC system having a compressor rack with at least one compressor. The method also includes monitoring and controlling, with a rack controller, operation of the compressor rack. The method also includes determining, with the system controller, a flood-back discharge temperature corresponding to a flood-back condition. The method also includes receiving, with the system controller, an actual discharge temperature associated with the compressor rack. The method also includes comparing, with the system controller, the actual discharge temperature with the flood-back discharge temperature. The method also includes generating, with the system controller, a notification to the rack controller based on the comparison.

In other features, the method can also include generating, with the system controller, the notification when a difference between the flood-back discharge temperature and the actual discharge temperature is less than a predetermined threshold.

In other features, the method can also include implementing, with the rack controller, a bump start operation after receiving the notification.

In other features, the method can also include activating, with the rack controller, crank case heaters after receiving the notification.

Another system is provided and includes a system controller for a refrigeration or HVAC system having a compressor rack with at least one compressor and a condensing unit with at least one condenser fan, the system controller monitoring and controlling operation of the refrigeration or HVAC system. A rack controller is in communication with the system controller, the rack controller monitoring and controlling operation of the compressor rack. A condensing unit controller in communication with the system controller, the condensing unit controller monitoring and controlling operation of the condensing unit. The system controller receives forecast weather data for a future time period, determines a predicted refrigeration system capacity needed for the future time period based on the forecast weather data, compares the predicted refrigeration system capacity with a predetermined capacity threshold, and generates an alert when the predicted refrigeration system capacity is greater than the predetermined capacity threshold.

In other features, the system controller modifies operation of the refrigeration system prior to the future time period to reduce a capacity of the refrigeration system during the future time period.

Another method is provided and includes monitoring and controlling, with a system controller, operation of a refrigeration or HVAC system having a compressor rack with at least one compressor and a condensing unit with at least one condenser fan. The method also includes monitoring and controlling, with a rack controller in communication with the system controller, operation of the compressor. The method also includes monitoring and controller, with a condensing unit controller in communication with the system controller, operation of the condensing unit. The method also includes receiving, with the system controller, forecast weather data for a future time period. The method also includes determining, with the system controller, a predicted refrigeration system capacity needed for the future time period based on the forecast weather data. The method also includes comparing, with the system controller, the predicted refrigeration system capacity with a predetermined capacity threshold. The method also includes generating, with the system controller, an alert when the predicted refrigeration system capacity is greater than the predetermined capacity threshold.

In other features, the method can also include modifying, with the system controller, operation of the refrigeration system prior to the future time period to reduce capacity of the refrigeration system during the future time period.

Another system is provided and includes a system controller for a refrigeration or HVAC system having a compressor rack with at least one compressor and a condensing unit with at least one condenser fan. A rack controller for the compressor rack, the rack controller being in communication with the system controller. A condensing unit controller for the condensing unit, the condensing unit controller being in communication with the system controller. The system controller receives component identification information identifying components of the compressor rack and the condensing unit, retrieves component information including at least one of component specification information, component capacity information, and component capability information, based on the component identification information, and performs setup operations based on the component information.

In other features, the controller transmits first data including one or more of the component identification information and the component information to a remote device, receives second data from the remote device for controlling one or more of the components of the compressor rack and the condensing unit based on the first data sent to the remote device, and controls the one or more of the components of the compressor rack and the condensing unit based on the second data received from the remote device.

In other features, the controller transmits one or more of the component identification information and the component information to a remote device for diagnosing one or more of the components of the compressor rack and the condensing unit and scheduling service for the one or more of the components of the compressor rack and the condensing unit from the remote device.

Another method is provided and includes receiving, with a system controller, component identification information identifying components of a compressor rack and a condensing unit of a refrigeration or HVAC system, the compressor rack having at least one compressor and an associated rack controller and the condensing unit having at least one condenser fan and an associated condensing unit controller. The method also includes retrieving, with the system controller, component information including at least one of component specification information, component capacity information, and component capability information, based on the component identification information. The method also includes performing, with the system controller, setup operations for the refrigeration or HVAC system based on the component information.

In other features, the method further includes transmitting, with the controller, first data including one or more of the component identification information and the component information to a remote device. The method further includes receiving, with the controller, second data from the remote device for controlling one or more of the components of the compressor rack and the condensing unit based on the first data sent to the remote device. The method further includes controlling, with the controller, the one or more of the components of the compressor rack and the condensing unit based on the second data received from the remote device.

In other features, the method further includes transmitting, with the controller, one or more of the component identification information and the component information to a remote device for diagnosing one or more of the components of the compressor rack and the condensing unit and scheduling service for the one or more of the components of the compressor rack and the condensing unit from the remote device.

Another system is provided and includes a system controller for a refrigeration or HVAC system having a compressor rack with at least one compressor and a condensing unit with at least one condenser fan. The system also includes a rack controller for the compressor rack, the rack controller being in communication with the system controller. The system also includes a condensing unit controller for the condensing unit, the condensing unit controller being in communication with the system controller. The system controller receives component identification information identifying components of the compressor rack and the condensing unit, retrieves component information including at least one of component specification information, component capacity information, and component capability information, based on the component identification information, and performs setup operations based on the component information.

Another method is provided and includes receiving, with a system controller, component identification information identifying components of a compressor rack and a condensing unit of a refrigeration or HVAC system, the compressor rack having at least one compressor and an associated rack controller and the condensing unit having at least one condenser fan and an associated condensing unit controller. The method also includes retrieving, with the system controller, component information including at least one of component specification information, component capacity information, and component capability information, based on the component identification information. The method also includes performing, with the system controller, setup operations for the refrigeration or HVAC system based on the component information.

Another system is provided and includes a controller for a refrigeration or HVAC system having a compressor rack with at least one compressor and a condensing unit with at least one condenser fan, the system controller monitoring operation of the refrigeration or HVAC system. The controller determines compressor rack power consumption data corresponding to a power consumption of the compressor rack and condensing unit power consumption data corresponding to a power consumption of the condensing unit, determines a total power consumption of the refrigeration or HVAC system based on the compressor rack power consumption data and the condensing unit power consumption data, determines at least one of a predicted power consumption and a benchmark power consumption for the refrigeration system, compares the total power consumption with at least one of the predicted power consumption and the benchmark power consumption, and generates a health indicator score based on the comparison.

In other features, the controller receives performance coefficients for the refrigeration or HVAC system and determines the predicted power consumption based on the performance coefficients and on operational data for the refrigeration or HVAC system.

In other features, the controller monitors power consumption data of the refrigeration or HVAC system over an initialization period and determined the benchmark power consumption based on the monitored power consumption data for the initialization period.

Another method is provided and includes monitoring, with a controller, operation of a refrigeration or HVAC system having a compressor rack with at least one compressor and a condensing unit with at least one condenser fan. The method also includes monitoring and controlling, with the controller, operation of the compressor rack. The method also includes determining, with the controller, compressor rack power consumption data for the compressor rack. The method also includes monitoring and controller, with the controller, operation of the condensing unit. The method also includes determining, with the controller, power consumption data for the condensing unit. The method also includes receiving, with the controller, the compressor rack power consumption data and the condensing unit power consumption data. The method also includes determining, with the controller, a total power consumption of the refrigeration or HVAC system based on the compressor rack power consumption data and the condensing unit power consumption data. The method also includes determining, with the controller, at least one of a predicted power consumption and a benchmark power consumption for the refrigeration system. The method also includes comparing, with the controller, the total power consumption with at least one of the predicted power consumption and the benchmark power consumption. The method also includes generating, with the controller, a health indicator score based on the comparison.

In other features, the method can also include receiving, with the controller, performance coefficients for the refrigeration or HVAC system and determining, with the controller, the predicted power consumption based on the performance coefficients and on operational data for the refrigeration or HVAC system.

In other features, the method can also include monitoring, with the controller, power consumption data of the refrigeration or HVAC system over an initialization period and determining, with the controller, the benchmark power consumption based on the monitored power consumption data for the initialization period.

Another system is provided and includes a system controller for a refrigeration or HVAC system having a compressor rack with at least one compressor and a condensing unit with at least one condenser fan, the system controller monitoring operation of the refrigeration or HVAC system. The system also includes a rack controller in communication with the system controller, the rack controller monitoring and controlling operation of the compressor rack and determining compressor rack power consumption data. The system also includes a condensing unit controller in communication with the system controller, the condensing unit controller monitoring and controlling operation of the condensing unit and determining condensing unit power consumption data. The system controller monitors operational data of the HVAC system, including at least one of a temperature and a pressure of the HVAC system, and generates a health indicator score based on the monitored operational data.

In other features, the system controller monitors at least one refrigeration case temperature, determines a trend for the at least one refrigeration case temperature over time, and generates the health indicator score based on the trend.

In other features, the system controller monitors at least one refrigeration case temperature after a defrost operation and generates the health indicator score based on the at least one refrigeration case temperature after the defrost operation.

In other features, the system controller monitors at least one refrigeration case superheat temperature, determines a trend for the at least one refrigeration case superheat temperature over time, and generates the health indicator score based on the trend.

In other features, the system controller monitors a suction superheat temperature, determines a trend for the suction superheat temperature over time, and generates the health indicator score based on the trend.

In other features, the system controller monitors an ambient temperature and a capacity of the condensing unit, determines a correlation between the ambient temperature and the capacity, determines a trend for the correlation over time, and generates the health indicator score based on the trend.

Another method is provided and includes monitoring, with a controller, operation of a refrigeration or HVAC system having a compressor rack with at least one compressor and a condensing unit with at least one condenser fan. The method also includes monitoring and controlling, with the controller, operation of the compressor rack. The method also includes determining, with the controller, compressor rack power consumption data for the compressor rack. The method also includes monitoring and controller, with the controller, operation of the condensing unit. The method also includes monitoring, with the system controller, operational data of the HVAC system, including at least one of a temperature and a pressure of the HVAC system. The method also includes generating, with the system controller, a health indicator score based on the monitored operational data.

In other features, the system controller monitors at least one refrigeration case temperature. The method can also include determining, with the system controller, a trend for the at least one refrigeration case temperature over time. The system controller generates the health indicator score based on the trend.

In other features, the system controller monitors at least one refrigeration case temperature after a defrost operation and generates the health indicator score based on the at least one refrigeration case temperature after the defrost operation.

In other features, the system controller monitors at least one refrigeration case superheat temperature. The method can also include determining, with the system controller, a trend for the at least one refrigeration case superheat temperature over time. The system controller generates the health indicator score based on the trend.

In other features, the system controller monitors a suction superheat temperature. The method also includes determining, with the system controller, a trend for the suction superheat temperature over time. The system controller generates the health indicator score based on the trend.

In other features, the system controller monitors an ambient temperature and a capacity of the condensing unit. The method further includes determining, with the system controller, a correlation between the ambient temperature and the capacity, and determining, with the system controller, a trend for the correlation over time. The system controller generates the health indicator score based on the trend.

A system is provided and includes a controller for a refrigeration or HVAC system having a compressor rack with at least one compressor. The controller includes a monitoring module and a tracking module. The monitoring module is configured to monitor power consumption of a compressor in the compressor rack based on data received from a power meter associated with the compressor, a supply voltage for the compressor, or amperage of the compressor. The tracking module is configured to diagnose health of the compressor based on the power consumption of the compressor.

In other features, the monitoring module further includes a voltage determining module, a power factor module, and a power consumption module. The voltage determining module is configured to determine the supply voltage for the compressor based on power supplied to the compressor rack and a number of compressors in the compressor rack. The power factor module is configured to adjust a power factor for the compressor based on the supply voltage and a voltage rating of the compressor. The power consumption module is configured to determine the power consumption of the compressor based on the adjusted power factor, the supply voltage for the compressor, and the amperage of the compressor.

In other features, the monitoring module further includes a power consumption module and an error correction module. The power consumption module is configured to estimate the power consumption of each compressor in the compressor rack based on the amperage of the compressor, a voltage rating of the compressor, and a power factor rating of the compressor. The error correction module is configured to determine an error correction factor to apply to the estimated power consumption of each compressor such that a sum of power consumption values of each compressor and other loads of the refrigeration or HVAC system equals a measured aggregate power consumption of the compressor rack.

Another system is provided and includes a controller for a refrigeration or HVAC system having a compressor rack with at least one compressor. The controller communicates with a tracking module configured to diagnose health of a compressor in the compressor rack. In response to rated performance data for the compressor being unavailable, the tracking module is configured to generate baseline data for the compressor and to diagnose health of the compressor by comparing operational data of the compressor to the baseline data for the compressor. In response to the rated performance data for the compressor being available, the tracking module is configured to diagnose health of the compressor by comparing the operational data of the compressor to the rated performance data for the compressor.

In other features, the controller includes the performance tracking module.

In other features, a remote controller includes the performance tracking module.

In other features, the tracking module includes a baseline data module and a monitoring module. The baseline data module is configured to generate the baseline data for the compressor based on data received from the compressor immediately following installation of compressor. The monitoring module is configured to diagnose health of the compressor by comparing the baseline data to the operational data of the compressor obtained subsequent to developing the baseline data.

In other features, the performance tracking module includes a regression-based monitoring module configured to perform a regression analysis on the rated performance data and the data obtained from the compressor during operation and to diagnose health of the compressor based on the regression analysis.

In other features, the regression-based monitoring module includes a benchmark generating module and an analyzing module. The benchmark generating module is configured to generate a benchmark polynomial and a benchmark hull. The analyzing module is configured to analyze data obtained from the compressor during operation using the benchmark polynomial and the benchmark hull and to diagnose health of the compressor based on the analysis.

In other features, the system further includes an optimizing module configured to select only statistically significant variables affecting a selected one of the rated performance data and to eliminate statistically insignificant variables, and to optimize the benchmark polynomial using the selected variables.

In other features, the system further includes an outlier detecting module configured to detect outliers in the data obtained from the compressor during operation and to remove outliers with largest deviation.

In other features, the system further includes a comparing module configured to compare the benchmark polynomial and the benchmark hull with historical benchmark polynomial and hull data and to diagnose health of the compressor based on the comparison.

Another system is provided and includes a controller for a refrigeration or HVAC system having a compressor rack with at least one compressor. The controller includes a discharge line temperature determining module and a compressor control module. The discharge line temperature determining module is configured to monitor in real time a plurality of operating parameters of a compressor in the compressor rack during operation of the compressor and to determine a minimum discharge line temperature based on the plurality of operating parameters. The compressor control module is configured to shut down the compressor in response to a discharge line temperature of the compressor being less than or equal to the minimum discharge line temperature for a predetermined period of time and to restart the compressor using a bump start method.

In other features, the minimum discharge line temperature represents a discharge line temperature corresponding to liquid refrigerant entering the compressor.

In other features, the compressor control module is configured to shut down the compressor further in response to a rate of change of the discharge line temperature being less than or equal to a predetermined threshold.

In other features, the plurality of operating parameters of the compressor includes a discharge pressure, a suction pressure, and a return gas temperature of the compressor.

In other features, the plurality of operating parameters of the compressor includes performance data of the compressor and properties of a refrigerant used in the compressor.

In other features, the plurality of operating parameters of the compressor includes whether liquid injection is employed in the compressor.

In other features, the discharge line temperature determining module is configured to adjust the minimum discharge line temperature in real time based on the plurality of operating parameters.

In other features, the controller is located remotely from the refrigeration or HVAC system, receives operational data from the compressor, and provides the minimum discharge line temperature and shutdown and restart instructions to the compressor.

Another method is provided and includes controlling, with a controller, a refrigeration or HVAC system having a compressor rack with at least one compressor. The method further includes monitoring, with a monitoring module, power consumption of a compressor in the compressor rack based on data received from a power meter associated with the compressor, a supply voltage for the compressor, or amperage of the compressor. The method further includes diagnosing, with a tracking module, health of the compressor based on the power consumption of the compressor.

In other features, the monitoring the power consumption of the compressor in the compressor rack further includes determining, with a voltage determining module, the supply voltage for the compressor based on power supplied to the compressor rack and a number of compressors in the compressor rack; adjusting, with a power factor module, a power factor for the compressor based on the supply voltage and a voltage rating of the compressor; and determining, with a power consumption module, the power consumption of the compressor based on the adjusted power factor, the supply voltage for the compressor, and the amperage of the compressor.

In other features, the method further includes estimating, with a power consumption module, the power consumption of each compressor in the compressor rack based on the amperage of the compressor, a voltage rating of the compressor, and a power factor rating of the compressor. The method further includes determining, with an error correction module, an error correction factor to apply to the estimated power consumption of each compressor such that a sum of power consumption values of each compressor and other loads of the refrigeration or HVAC system equals a measured aggregate power consumption of the compressor rack.

Another method is provided and includes controlling, with a controller, a refrigeration or HVAC system having a compressor rack with at least one compressor. The method further includes communicating with a performance tracking module configured to diagnose health of a compressor in the compressor rack. The method further includes, in response to rated performance data for the compressor being unavailable, generating, with the performance tracking module, baseline data for the compressor and diagnosing health of the compressor by comparing operational data of the compressor to the baseline data for the compressor. The method further includes, in response to the rated performance data for the compressor being available, diagnosing, with the performance tracking module, health of the compressor by comparing the operational data of the compressor to the rated performance data for the compressor.

In other features, the method further includes generating, with a baseline data module, the baseline data for the compressor based on data received from the compressor immediately following installation of compressor. The method further includes diagnosing, with a monitoring module, health of the compressor by comparing the baseline data to the operational data of the compressor obtained subsequent to developing the baseline data.

In other features, the method further includes performing, with a regression-based monitoring module, a regression analysis on the rated performance data and the data obtained from the compressor during operation. The method further includes diagnosing, with the regression-based monitoring module, health of the compressor based on the regression analysis.

In other features, the method further includes generating, with a benchmark generating module, a benchmark polynomial and a benchmark hull, and analyzing, with an analyzing module, data obtained from the compressor during operation using the benchmark polynomial and the benchmark hull and diagnosing health of the compressor based on the analysis.

In other features, the method further includes selecting, with an optimizing module, only statistically significant variables affecting a selected one of the rated performance data and eliminating statistically insignificant variables; and optimizing, with the optimizing module, the benchmark polynomial using the selected variables.

In other features, the method further includes detecting, with an outlier detecting module, outliers in the data obtained from the compressor during operation and removing outliers with largest deviation.

In other features, the method further includes comparing, with a comparing module, the benchmark polynomial and the benchmark hull with historical benchmark polynomial and hull data and diagnosing health of the compressor based on the comparison.

Another method is provided and includes controlling, with a controller, a refrigeration or HVAC system having a compressor rack with at least one compressor. The method further includes monitoring, with a discharge line temperature determining module, in real time, a plurality of operating parameters of a compressor in the compressor rack during operation of the compressor and determining a minimum discharge line temperature based on the plurality of operating parameters. The method further includes shutting down the compressor, with a compressor control module, in response to a discharge line temperature of the compressor being less than or equal to the minimum discharge line temperature for a predetermined period of time and restarting the compressor using a bump start method.

In other features, the minimum discharge line temperature represents a discharge line temperature corresponding to liquid refrigerant entering the compressor.

In other features, the method further includes shutting down the compressor, with the compressor control module, further in response to a rate of change of the discharge line temperature being less than or equal to a predetermined threshold.

In other features, the plurality of operating parameters of the compressor includes a discharge pressure, a suction pressure, and a return gas temperature of the compressor.

In other features, the plurality of operating parameters of the compressor includes performance data of the compressor and properties of a refrigerant used in the compressor.

In other features, the plurality of operating parameters of the compressor includes whether liquid injection is employed in the compressor.

In other features, the method further includes adjusting, with the discharge line temperature determining module, the minimum discharge line temperature in real time based on the plurality of operating parameters.

In other features, the controller is located remotely from the refrigeration or HVAC system, and the method further includes receiving, with the controller, operational data from the compressor; and providing, with the controller, the minimum discharge line temperature and shutdown and restart instructions to the compressor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2 is a flowchart of example operation in calculating a health indicator score;

FIG. 3 is a flowchart of example operation in calculating predicted power consumption;

In the drawings, reference numbers may be reused to identify similar and/or identical elements.

DETAILED DESCRIPTION

Example embodiments will now be described more fully with reference to the accompanying drawings.

Figure 1:
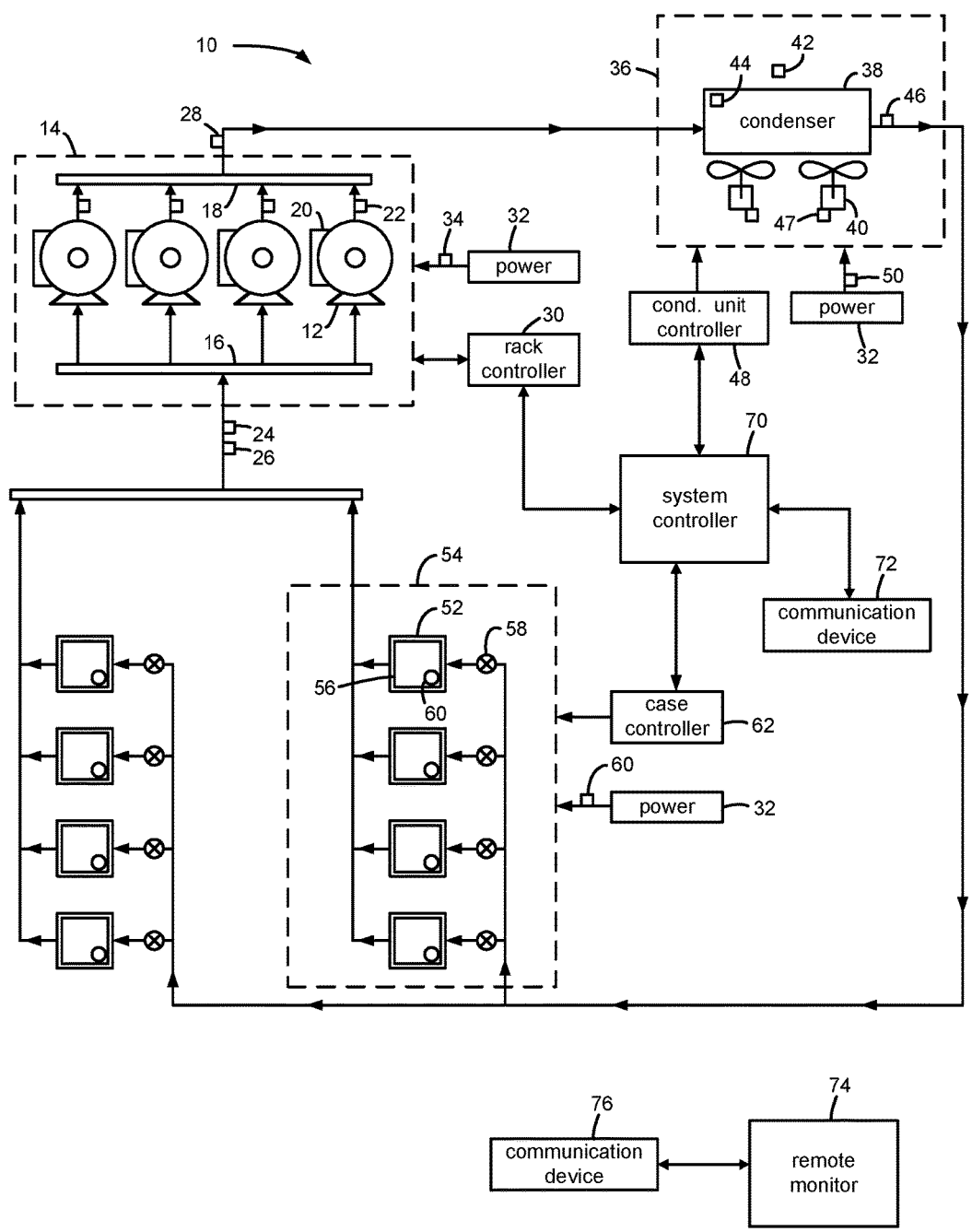
FIG. 1 is a block diagram of an example refrigeration system.

With reference to FIG. 1, an exemplary refrigeration system 10 is shown and includes a plurality of compressors 12 piped together in a compressor rack 14 with a common suction manifold 16 and a discharge header 18. While FIG.

1 shows an example refrigeration system 10, the teachings of the present disclosure also apply, for example, to HVAC systems.

Each compressor 12 has an associated compressor controller 20 that monitors and controls operation of the compressor 12. For example, the compressor controller 20 may monitor electric power, voltage, and/or current delivered to the compressor 12 with a power sensor, a voltage sensor, and/or a current sensor. Further, the compressor controller 20 may also monitor suction or discharge temperatures or pressures of the compressor 12 with suction or discharge temperature or pressure sensors. For example, a discharge outlet of each compressor 12 can include a respective discharge temperature sensor 22. A discharge pressure sensor can be used in addition to, or in place of, the discharge temperature sensor 22. An input to the suction manifold 16 can include both a suction pressure sensor 24 and a suction temperature sensor 26. Further, a discharge outlet of the discharge header 18 can include an associated discharge pressure sensor 28. A discharge temperature sensor can be used in addition to, or in place of, the discharge pressure sensor 28. As described in further detail below, the various sensors can be implemented for monitoring performance and diagnosing the compressors 12 in the compressor rack 14.

A rack controller 30 may monitor and control operation of the compressor rack 14 via communication with each of the compressor controllers 20. For example, the rack controller 30 may instruct individual compressors 12 to turn on or turn off through communication with the compressor controllers 20. Additionally, the rack controller 30 may instruct variable capacity compressors to increase or decrease capacity through communication with the compressor controllers 20. In addition, the rack controller 30 may receive data indicating the electric power, voltage, and/or current delivered to each of the compressors 12 from the compressor controllers 20. Further, the rack controller 30 may also receive data indicating the suction or discharge temperatures or pressures of each of the compressors 12 from the compressor controllers 20. Additionally or alternatively, the rack controller 30 may communicate directly with the suction or discharge temperature or pressure sensors to receive such data. Additionally, the rack controller 30 may be in communication with other suction and discharge temperature and pressure sensors, including, for example, discharge pressure sensor 28, suction pressure sensor 24, and suction temperature sensor 26.

Electric power may be delivered to the compressor rack 14 from a power supply 32 for distribution to the individual compressors 12. A rack power sensor 34 may sense the amount of power delivered to the compressor rack 14. A current sensor or a voltage sensor may be used in place of or in addition to the power sensor 34. The rack controller 30 may communicate with the rack power sensor 34 and monitor the amount of power delivered to the compressor rack 14. Alternatively, the rack power sensor 34 may be omitted and the total power delivered to the compressor rack 14 may be determined based on the power data for the power delivered to each of the individual compressors 12 as determined by the compressor controllers 20.

The compressor rack 14 compresses refrigerant vapor that is delivered to a condensing unit 36 having a condenser 38 where the refrigerant vapor is liquefied at high pressure. Condenser fans 40 may enable improved heat transfer from the condenser 38. The condensing unit 36 can include an associated ambient temperature sensor 42, a condenser temperature sensor 44, and/or a condenser discharge pressure sensor 46. Each of the condenser fans 40 may include a condenser fan power sensor 47 that senses the amount of power delivered to each of the condenser fans 40. A current sensor or a voltage sensor may be used in place of or in addition to the condenser fan power sensor 47.

A condensing unit controller 48 may monitor and control operation of the condenser fans 40. For example, the condensing unit controller 48 may turn on or turn off individual condenser fans 40 and/or increase or decrease capacity of any variable speed condenser fans 40. In addition, the condensing unit controller 48 may receive data indicating the electric power delivered to each of the condenser fans 40 through communication with the condenser fan power sensors 47. Additionally, the condensing unit controller 48 may be in communication with the other condensing unit sensors, including, for example, the ambient temperature sensor 42, the condenser temperature sensor 44, and the condenser discharge pressure sensor 46.

Electric power may be delivered to the condensing unit 36 from the power supply 32 for distribution to the individual condenser fans 40. A condensing unit power sensor 50 may sense the amount of power delivered to the condensing unit 36. A current sensor or a voltage sensor may be used in place of or in addition to the condensing unit power sensor 50. The condensing unit controller 48 may communicate with the condensing unit power sensor 50 and monitor the amount of power delivered to the condensing unit 36.

The high-pressure liquid refrigerant from the condensing unit 36 may be delivered to refrigeration cases 52. For example, refrigeration cases 52 may include a group 54 of refrigeration cases 52. The refrigeration cases 52 may be refrigerated or frozen food cases at a grocery store, for example. Each refrigeration case 52 may include an evaporator 56 and an expansion valve 58 for controlling the superheat of the refrigerant and an evaporator temperature sensor 60. The refrigerant passes through the expansion valve 58 where a pressure drop causes the high pressure liquid refrigerant to achieve a lower pressure combination of liquid and vapor. As hot air from the refrigeration case 52 moves across the evaporator 56, the low pressure liquid turns into gas. The low pressure gas is then delivered back to the compressor rack 14, where the refrigeration cycle starts again.

A case controller 62 may monitor and control operation of the evaporators 56 and/or the expansion valves 58. For example, the case controller 62 may turn on or turn off evaporator fans of the evaporators 54 and/or increase or decrease capacity of any variable speed evaporator fans. The case controller 62 may be in communication with the evaporator temperature sensor 60 and receive evaporator temperature data.

Electric power may be delivered to the group 54 of refrigeration cases 52 from the power supply 32 for distribution to the individual condenser fans 40. A refrigeration case power sensor 60 may sense the amount of power delivered to the group 54 of refrigeration cases 52. A current sensor or a voltage sensor may be used in place of or in addition to the refrigeration case power sensor 60. The case controller 62 may communicate with the refrigeration case power sensor 60 and monitor the amount of power delivered to the group 54 of refrigeration cases 52.

As discussed above, while FIG. 1 shows an example refrigeration system 10, the teachings of the present disclosure also apply, for example, to HVAC systems, including, for example, air conditioning and heat pump systems. In the example of an HVAC system, the evaporators 56 would be installed in air handler units instead of in refrigeration cases 52.

A system controller 70 monitors and controls operation of the entire refrigeration system 10 through communication with each of the rack controller 30, condensing unit controller 48, and the case controller 62. Alternatively, the rack controller 30, condensing unit controller 48, and/or case controller 62 could be omitted and the system controller 70 could directly control the compressor rack 14, condensing unit 36, and/or group 54 of refrigeration cases 52. The system controller 70 can receive the operation data of the refrigeration system 10, as sensed by the various sensors, through communication with the rack controller 30, condensing unit controller 48, and/or case controller 62. For example, the system controller can receive data regarding the various temperatures and pressures of the system and regarding electric power, current, and/or voltage delivered to the various system components. Alternatively, some or all of the various sensors may be configured to communicate directly with the system controller 70. For example, the ambient temperature sensor 42 may communicate directly with the system controller 70 and provide ambient temperature data.

The system controller 70 may coordinate operation of the refrigeration system, for example, by increasing or decreasing capacity of various system components. For example, the system controller 70 may instruct the rack controller 30 to increase or decrease capacity by activating or deactivating a compressor 12 or by increasing or decreasing capacity of a variable capacity compressor 12. The system controller 70 may instruct the condensing unit controller 48 to increase or decrease condensing unit capacity by activating or deactivating a condenser fan 40 or by increasing or decreasing a speed of a variable speed condenser fan 40. The system controller 70 may instruct the case controller 62 to increase or decrease evaporator capacity by activating or deactivating an evaporator fan of an evaporator 56 or by increasing or decreasing a speed of a variable speed evaporator fan. The system controller 70 may include a computer-readable medium, such as a volatile or non-volatile memory, to store instructions executable by a processor to carry out the functionality described herein to monitor and control operation of the refrigeration system 10.

The system controller 70 may be, for example, an E2 RX refrigeration controller available from Emerson Climate Technologies Retail Solutions, Inc. of Kennesaw, Ga. If the system is an HVAC system instead of a refrigeration system, the system controller 70 may be, for example, an E2 BX HVAC and lighting controller also available from Emerson Climate Technologies Retail Solutions, Inc. of Kennesaw, Ga. Further, any other type of programmable controller that may be programmed with the functionality described in the present disclosure can also be used.

The system controller 70 may be in communication with a communication device 72. The communication device 72 may be, for example, a desktop computer, a laptop, a tablet, a smartphone or other computing device with communication/networking capabilities. The communication device 72 may communicate with the system controller 70 via a local area network at the facility location of the refrigeration system 10. The communication device 72 may also communicate with the system controller 70 via a wide area network, such as the internet.

The communication device 72 may communicate with the system controller 70 to receive and view operational data of the refrigeration system 10, including, for example, energy or performance data for the refrigeration system 10.

The system controller 70 may also communicate with a remote monitor 74 via, for example, a wide area network, such as the internet, or via phone lines, cellular, and/or satellite communication. The remote monitor 74 may communicate with multiple system controllers 70 associated with multiple refrigeration or HVAC systems. The remote monitor 74 may also be accessible to a communication device 76, such as a desktop computer, a laptop, a tablet, a smartphone or other computing device with communication/networking capabilities. The communication device 76 may communicate with the remote monitor 74 to receive and view operational data for one or more refrigeration or HVAC systems, including, for example, energy or performance data for the refrigeration or HVAC systems.

The system controller 70 can monitor the actual power consumption of the refrigeration system 10, including the compressor rack 14, the condensing unit 36, and the refrigeration cases 52, and compare the actual power consumption of the refrigeration system 10 with a predicted power consumption or with a benchmark power consumption for the refrigeration system 10 to determine a health indicator score for the refrigeration system 10 and/or for individual refrigeration system components. Additionally or alternatively, the system controller 70 can monitor the temperatures and pressures of the refrigeration system 10, including the compressor rack 14, the condensing unit 36, and the refrigeration cases 52, and compare the temperatures and/or pressures with expected temperatures and/or pressures, based, for example, on historical data to determine a health indicator score for the refrigeration system 10 and/or for individual refrigeration system components.

With reference to FIG. 2, a control algorithm 200 is shown for calculating a health indicator score for the refrigeration system and/or a refrigeration system component. The control algorithm 200 may be performed, for example, by the system controller 70 and starts at 202. At 204, the system controller 70 receives actual power consumption data for the refrigeration system 10 and/or for a system component of the refrigeration system 10. For example, as discussed above, the system controller 70 can receive power consumption data regarding the compressor rack 14, the condensing unit 36, and the group 54 of refrigeration cases 52 from the rack controller 30, the condensing unit controller 48, and the case controller 62. At 206, the system controller 70 determines predicted or benchmark power consumption for the refrigeration system 10 and/or the system component based on operational data for the refrigeration system 10. Further details for determining the predicted or benchmark power consumption are discussed below with reference to FIGS. 3 and 4.

At 208, the system controller 70 compares the predicted or benchmark power consumption with the actual power consumption for the system and/or the system component. At 210, the system controller 70 determines a health indicator score for the refrigeration system and/or the system component based on the comparison. For example, when the actual power consumption is relatively close to the predicted or benchmark power consumption, the calculated health indicator score may indicate that the refrigeration system and/or system component is performing well. Additionally, when the actual power consumption is not relatively close to the predicted or benchmark power consumption, the calculated health indicator score may indicate that the refrigeration system and/or system component is not performing well.

While the control algorithm 200 is shown and described in terms of calculating a health indicator score for the refrigeration system 10 or for a refrigeration system component, the system controller 70 may additionally or alternatively calculate a health indicator score individually for each of the refrigeration system components and then determine an overall refrigeration system health indicator score based on the health indicator scores for the individual components. For example, the system controller 70 may average the individual health indicator scores and/or perform an averaging with a weighting function for certain health indicator scores to determine the overall health indicator score for the refrigeration system 10.

The health indicator scores for the refrigeration system 10 and/or the refrigeration system components may be communicated to the communication device 72, remote monitor 74, and/or communication device 76 for display to a user of the refrigeration system. For example, the communication devices 72, 76 may display the overall health indicator score for the refrigeration system 10 and allow a user to drill down to view the individual health indicator scores for the individual refrigeration system components. Based on the health indicator scores, the user may determine that maintenance is needed or that particular components need to be repaired or replaced. Additionally, the system controller 70 may send an alert once the health indicator score for the refrigeration system 10 and/or a refrigeration system component is below a predetermined threshold. For example, the refrigeration system 70 may send an alert to a user via the communication devices 72, 76 to perform an inspection of the refrigeration system 10 and/or refrigeration system component with the low health indicator score. Additionally, the system controller 70 may modify operation of the refrigeration system 70 to avoid use of the refrigeration system component with the low health indicator score. The control algorithm 200 ends at 212.

Further, while control algorithm 200 is shown and described in terms of comparing actual power consumption with predicted or benchmark power consumption, other operational data values may be used by the system controller 70 for the comparison to determine the health indicator score(s). For example, the system controller may compare an actual discharge temperature or pressure with predicted or benchmark discharge temperatures or pressures to determine the health indicator scores. The predicted or benchmark discharge temperatures or pressures may be calculated based on the performance coefficients for the component and/or based on historical operation data for the component, including operational data monitored and stored during an initialization period. For example, the system controller 70 may determine a compressor rack health indicator score for the compressor rack 14 based on a discharge temperature or pressure of the compressor rack 14 after stabilization. The discharge temperature or pressure of the compressor rack 14 after stabilization could be compared with a predicted or benchmark discharge temperature or pressure. Additionally, the operational data comparison could be performed in conjunction with the power consumption comparison and the health indicator score for the component could be determined based on both comparisons.

Additionally or alternatively, for the refrigeration cases 52, the health indicator score could be based on the refrigeration case's ability to hold a predetermined temperature or superheat and/or the length of time that the refrigeration case is able to hold the predetermined temperature or superheat. Additionally or alternatively, the health indicator score could be based on the pull down performance of the refrigeration case 52 after a defrost operation. In such case, the health indicator score could be based on how quickly the refrigeration case 52 is able to reach a predetermined target temperature after a defrost operation.

With reference to FIG. 3, a control algorithm 300 is shown for determining predicted power consumption based on performance coefficients for system components and operational data for the system. The functionality of FIG. 3, for example, is encapsulated at 206 of FIG. 2. The control algorithm 300 may be performed by the system controller 70 and starts at 302. At 304, the system controller 70 receives performance coefficient data for the system components of the refrigeration system 10. The performance coefficients are published by system component manufacturers and can be used to determine expected operational characteristics, including predicted power consumption, for a given system component, given particular operation conditions. For example, the compressor manufacturer may publish performance coefficients for a particular model of compressor. The system controller 70 may, for example, access a public database of performance coefficients at a system component manufacturer's website and determine the particular performance coefficients for the system components included in the refrigeration system. The performance coefficients may correspond to a particular model of the system component. Alternatively, the performance coefficients may be determined on a per-component basis at the time of manufacture. In such case, the performance coefficients may correspond to a particular model and serial number for the system component. For example, the system controller 70 may query the manufacturer's database with the particular model and serial number for the particular component to retrieve the performance coefficients. Additionally, the performance coefficients may be stored in a non-volatile memory on or with the system component itself. Alternatively, the performance coefficients may be received from a user via the communication device 72 or from the remote monitor 74 or communication device 76. After receiving the performance coefficients at 304, the system controller 70 proceeds to 306.

At 306, the system controller 70 receives operational data for the refrigeration system. For example, the operational data may include: discharge temperatures and/or pressures for the compressor rack 14; suction temperatures and/or pressures for the compressor rack 14; condensing temperature; condensing unit discharge temperature and/or pressure; evaporator temperatures and/or pressures; and/or outdoor ambient temperatures; etc. The operational data can be indicative of the load on the refrigeration system 10 and can be used, along with performance coefficients, to determine predicted power consumption for the refrigeration system 10 for a particular load.

At 308, the system controller 70 calculates the predicted power consumption based on the performance coefficients for the system components and the operational data for the refrigeration system 10. At 310, the control algorithm 300 ends.

Figure 4:
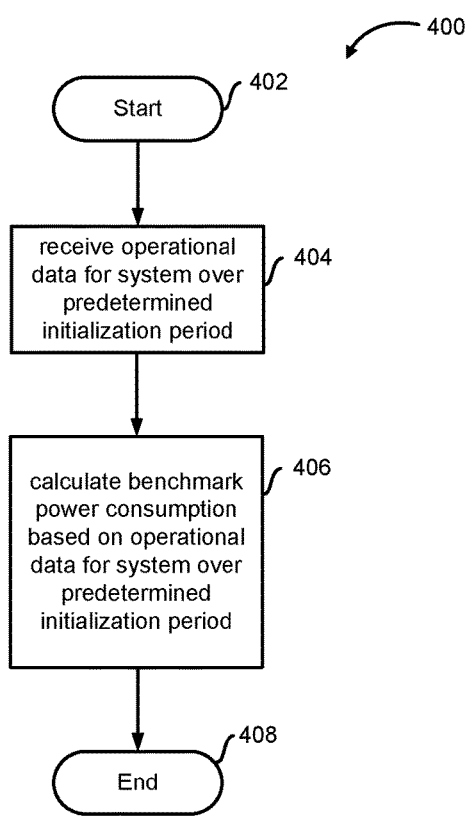
FIG. 4 is a flowchart of example operation in calculating benchmark power consumption.

With reference to FIG. 4, a control algorithm 400 is shown for determining benchmark power consumption based on system performance during a predetermined time period, such as an initialization period. The functionality of FIG. 4, for example, is encapsulated at 206 of FIG. 2. The control algorithm 400 may be performed by the system controller 70 and starts at 402. At 404, the system controller 70 receives operation data for the system during a predetermined initialization period. For example, the predetermined initialization period may be a time period, such as one or more weeks or months, just after the refrigeration system 10 is first installed or first repaired, or after maintenance is performed on the refrigeration system 10. The operational data may include: discharge temperatures and/or pressures for the compressor rack 14; suction temperatures and/or pressures for the compressor rack 14; condensing temperature; condensing unit discharge temperature and/or pressure; evaporator temperatures and/or pressures; and/or outdoor ambient temperatures; etc., as well as power consumption data for the refrigeration system components, such as the compressor rack 14, condensing unit 36, and refrigeration cases 52.

At 406, the system controller 70 calculates benchmark power consumption data based on the operational data for the system over the predetermined initialization period. In this way, the benchmark power consumption may be associated, for example, with the power consumed by the system after installation, maintenance, or repair. As discussed above, the actual power consumption can then be compared with the benchmark power consumption to determine whether refrigeration system performance has degraded and to what extent additional power is being consumed by the refrigeration system 10 due to deterioration. The control algorithm 400 ends at 408.

Systems and methods for calculating projected energy consumption data for a component of a refrigeration system based on ambient temperature data for comparison with actual energy consumption data are described in U.S. Pat. No. 8,065,886, which is incorporated herein by reference in its entirety.

Figure 5:
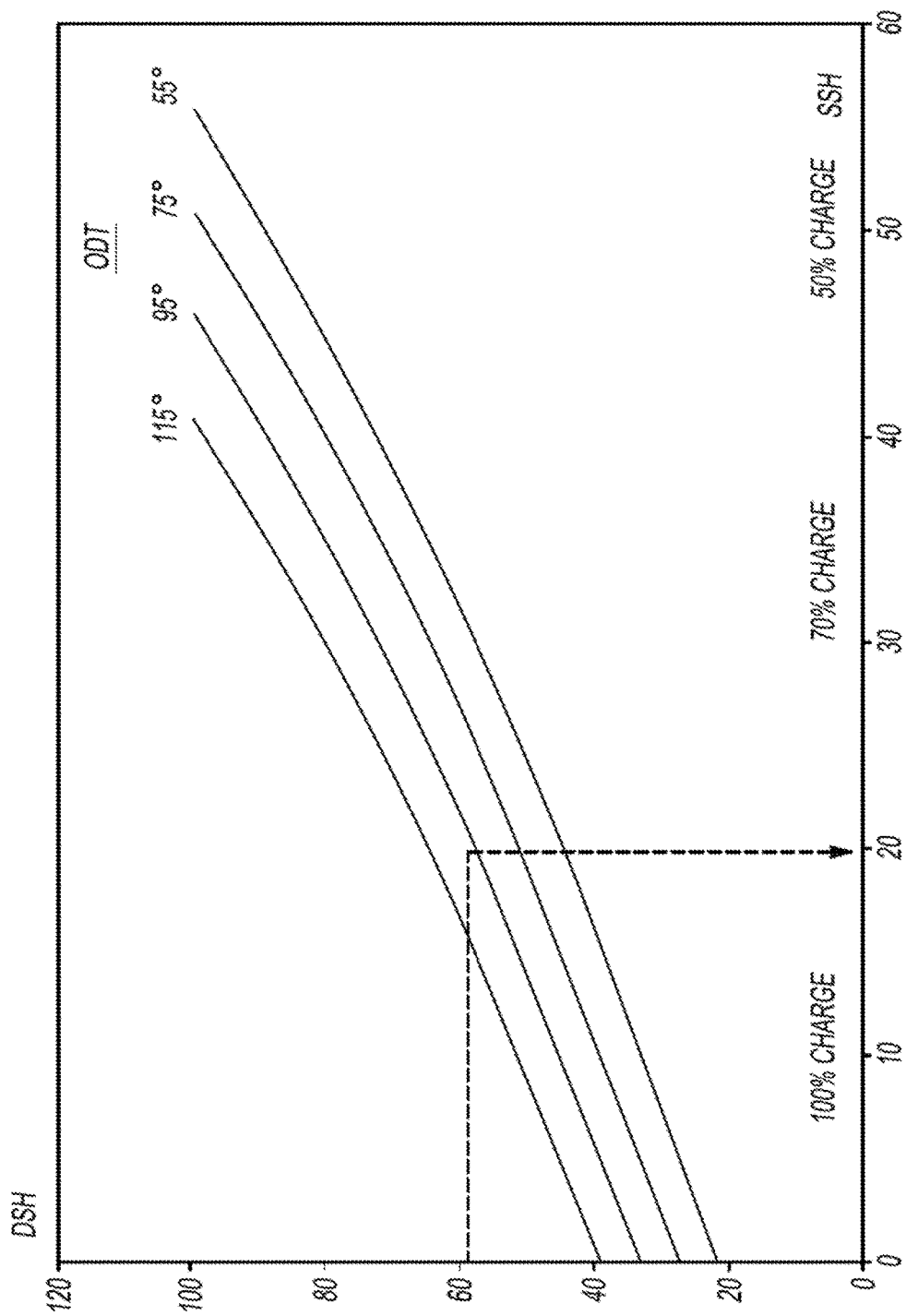
FIG. 5 is a graph showing discharge superheat correlated with suction superheat and outdoor temperature.

The system controller 70 may monitor operational data of the refrigeration system 10 and determine when a flood-back condition is occurring. A flood-back condition may occur, for example, when suction superheat (SSH) is approaching zero degrees. As shown in FIG. 5, SSH may be correlated to discharge superheat (DSH). The correlation between DSH and SSH may be particularly accurate for scroll type compressors, with outside ambient temperature being only a secondary effect. As shown in FIG. 5, correlations between DSH and SSH are shown for outdoor temperatures (ODT) of one-hundred fifteen degrees Fahrenheit, ninety-five degrees Fahrenheit, seventy-five degrees Fahrenheit, and fifty-five degrees Fahrenheit. The correlation shown in FIG. 5 is an example only and specific correlations for specific compressors may vary by compressor type, model, capacity, etc. As further shown in FIG. 5, typical SSH temperatures for exemplar refrigerant charge levels are shown. For example, as the percentage of refrigerant charge in the refrigeration system 10 decreases, SSH typically increases.

Figure 6:
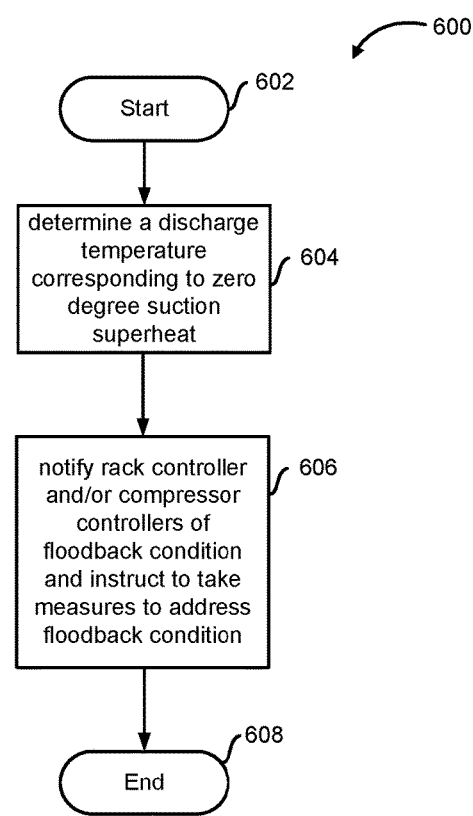
FIG. 6 is a flowchart of example operation in detecting and addressing a compressor flood-back condition.

With reference to FIG. 6, a control algorithm 600 is shown for determining a flood-back condition and taking appropriate measures. The control algorithm 600 may be performed by the system controller 70 and starts at 602. At 604, the system controller 70 monitors operational data and calculates a discharge temperature of the compressor rack 14 that corresponds to a zero degree SSH, i.e., a flood-back condition. At 606, once a flood-back condition is detected, the system controller 70 may notify the rack controller 30 and/or the individual compressor controllers 20 of the flood-back condition and instruct them to take measures to address the flood-back condition. The rack controller 30 and/or the individual compressor controllers 20 may then take appropriate action to address the flood-back condition. For example, the rack controller 30 and/or the individual compressor controllers may operate any crank case heaters associated with the compressor to heat the crankcase(s) of the compressor(s) 12 and drive liquid refrigerant out of the compressors 12. Crankcase heater systems and methods for variable speed compressors are described, for example, in U.S. Pat. No. 8,734,125, which is incorporated herein by reference in its entirety.

Additionally or alternatively, the compressor rack controller 30 and/or the individual compressor controllers 20 may implement a flooded start control algorithm for starting the individual compressors when a flood-back condition is present. For example, when started in a flood-back condition, the compressors may be cycled on and off with one or more short on/off cycles to gradually pump liquid from the compressor without completely emptying the compressor of liquid refrigerant and lubricant. As more time is allowed for the refrigerant/lubricant to work through the refrigeration system and return to the compressor before the compressor is emptied of liquid and lubricant. Further, the gradual pumping allows additional time for the compressor to heat up on its own due to operation of the electric motor in the compressor and due to the rotation of the internal moving parts of the compressor. Systems and methods for flooded start control are described in U.S. Pub. No. 2014/0308138, which is incorporated herein by reference in its entirety. Additionally, further, systems and methods for monitoring compressor flood-back are described in U.S. Pat. No. 9,057,549, which is likewise incorporated herein by reference in its entirety. The control algorithm 600 ends at 608.

Figures 7, 8:
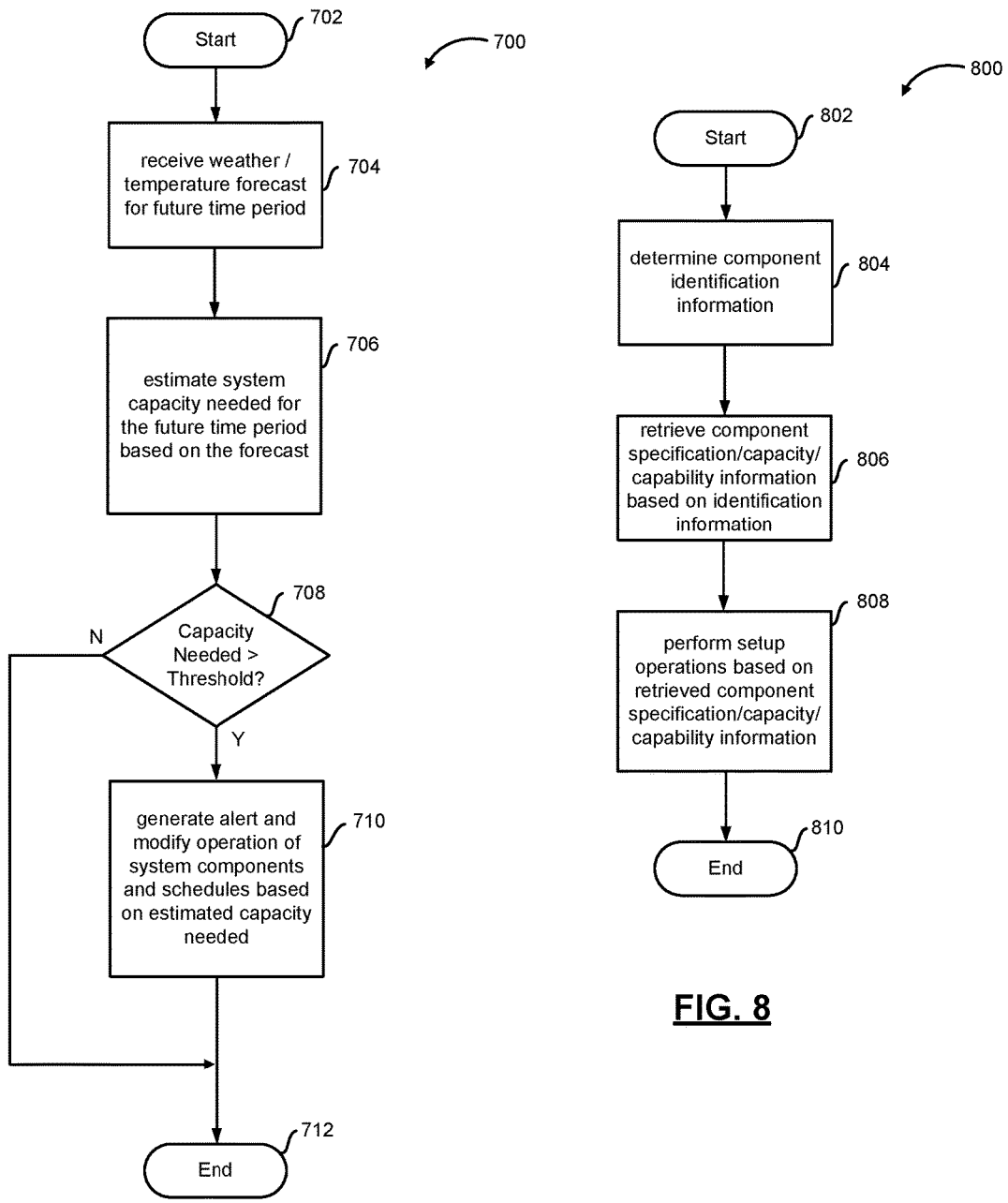
FIG. 7 is a flowchart of example operation in predicting needed capacity based on forecast data.
FIG. 8 is a flowchart of example operation in performing setup operation based on retrieved component information.

With reference to FIG. 7, a control algorithm 700 is shown for predicting a performance or capacity issue for a future time period. The control algorithm 700 may be performed by the system controller 70 and starts at 702. At 704, the system controller 70 receives weather or temperature forecast data for a future time period. The system controller 70 may access a weather database or weather service website and/or receive weather forecast and temperature data from the remote monitor 74, the communication device, or the communication device 76. At 706, the system controller 70 estimates the predicted refrigeration capacity that will be needed based on the indicated weather or temperature forecast data. Based on monitoring the operational data of the refrigeration system 70 over time, the system controller 70 may learn the capacity and capability of the refrigeration system 70 for various ambient outdoor temperatures. Based on that historical data, the system controller 70 may then be able to predict the refrigeration capacity that will be needed from the refrigeration system 70 for a given forecasted temperature. For example, based on the forecast, the system controller 70 can predict the anticipated load on the refrigeration system 10 as well as the anticipated refrigeration capacity that will be needed.

At 710, the system controller 70 determines whether the predicted capacity needed is greater than a predetermined threshold. At 710, when the predicted capacity needed is greater than the predetermined threshold, the system controller 70 can send an alert to a user or operator of the refrigeration system 10 via the communication device 72, remote monitor 74, and/or communication device 76. Additionally, the system controller 70 can modify operation of the system components and schedules. For example, the system controller 70 may reschedule previously scheduled defrost operations. Additionally, the system controller 70 may implement precooling prior to the future time period. For example, the system controller 70 may increase capacity of the refrigeration system 10 prior to the future time period to decrease the temperature in particular refrigeration cases 52 prior to the future time period. In this way, the load on the refrigeration system 10 during the future time period may be decreased as compared with normal operation. The control algorithm 700 ends at 712.

With reference to FIG. 8, a control algorithm 800 is shown for performing automatic setup operations for system components based on retrieved component information. The control algorithm 800 may be performed by the system controller 70 and/or by a specific component controller, such as the rack controller 30, the condensing unit controller 48, and/or the case controller 62. In the example of FIG. 8, the control algorithm 800 will be discussed in terms of being performed by the rack controller 30. The control algorithm starts at 802.

At 804, the rack controller 30 determines component identification information for each of the components in the compressor rack 14. For example, the compressor rack 14 may determine a model and serial number for each compressor 12 in the compressor rack 14. For example, the compressor rack controller 30 may communicate with the compressor controllers 20 and retrieve model and serial number information stored at the compressor controllers 20 for the individual compressors 12. Alternatively, the compressors 12 may include a barcode that uniquely identifies the compressor and/or that corresponds to the compressor's model and serial number. An installer may scan the barcode on the compressor with a scanning device, such as a smartphone, to obtain the unique identification information. The identification information may then input to the rack controller and/or input to the system controller 70, for example, via the communication device 72.

At 806, once the unique identification information for the compressors has been retrieved, the rack controller 30 can retrieve component specification/capacity/capability information, based on the identification information, for each component. For example, the rack controller 30 may access a component manufacturer website or database to retrieve information about the specific components. For example, the rack controller 30 may access the compressor manufacturer's website or database and retrieve information about each of the specific compressors 12 in the compressor rack 14. Alternatively, the rack controller 30 may communicate with the system controller 70 and request the system controller 70 to access the component manufacturer's website or database to retrieve the information.

The specification, capacity, and/or capability information may include specific information about the particular component, such as the specific compressors 12. For example, the specific information may include: the capacity, size, and/or horsepower rating for the compressor; the type of compressor (i.e., scroll, reciprocating, etc.); information indicating whether the compressor is a variable capacity compressor and, if so, the type of capacity modulation available (i.e., variable speed, blocked suction, scroll separation, etc.); information indicating whether the compressor has an unloader device; information indicating whether the compressor has a crankcase heater; and any other information specific to the compressor that could be used by the rack controller 30 during operation of the compressor rack 14.

At 808, the rack controller 30 may perform setup operations based on the retrieved component specification, capacity, and capability information. For example, the rack controller 30 may store the information for each compressor in memory for use during operation. Additionally, the rack controller 30 may perform a physical to logical mapping based on the identification information. For example, the rack controller 30 may identify one of the compressors as "compressor #1" in the rack and will associate all of that compressor's specification information to the logical "compressor #1." At 810, the control algorithm 800 ends.

Figure 9A:
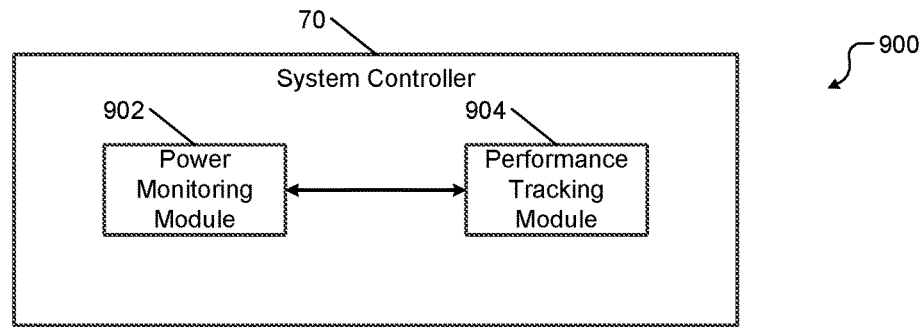
FIGS. 9A and 9B are block diagrams of an example system for monitoring power consumption of compressors of the refrigeration system of FIG. 1.
Figure 9B:
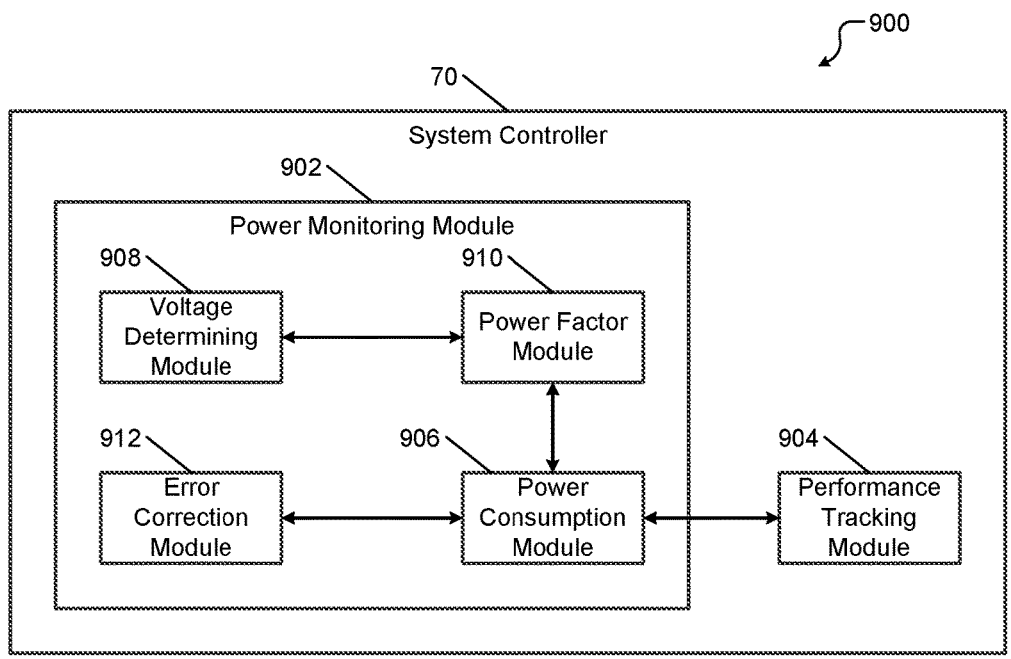
Figure 10:
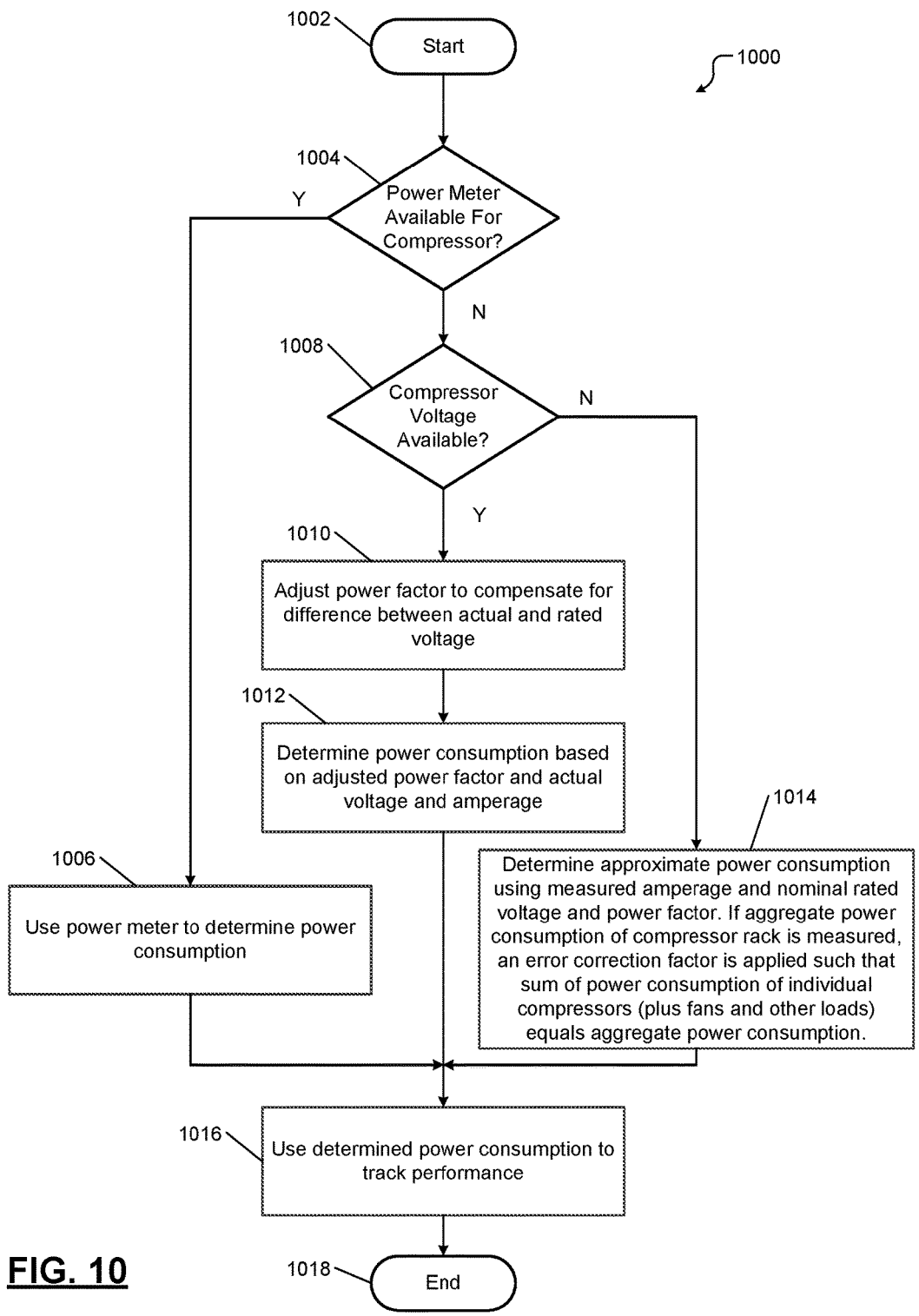
FIG. 10 is a flowchart of an example operation in monitoring power consumption of compressors of the refrigeration system of FIG. 1.
Figure 11:
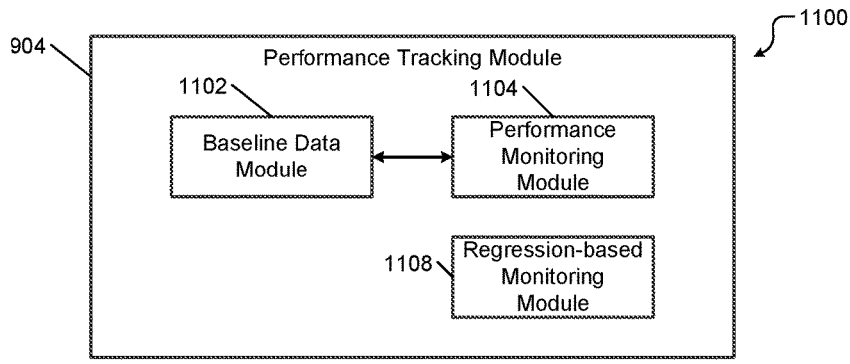
FIG. 11 is a block diagram of an example system for tracking performance of compressors of the refrigeration system of FIG. 1.
Figure 12:
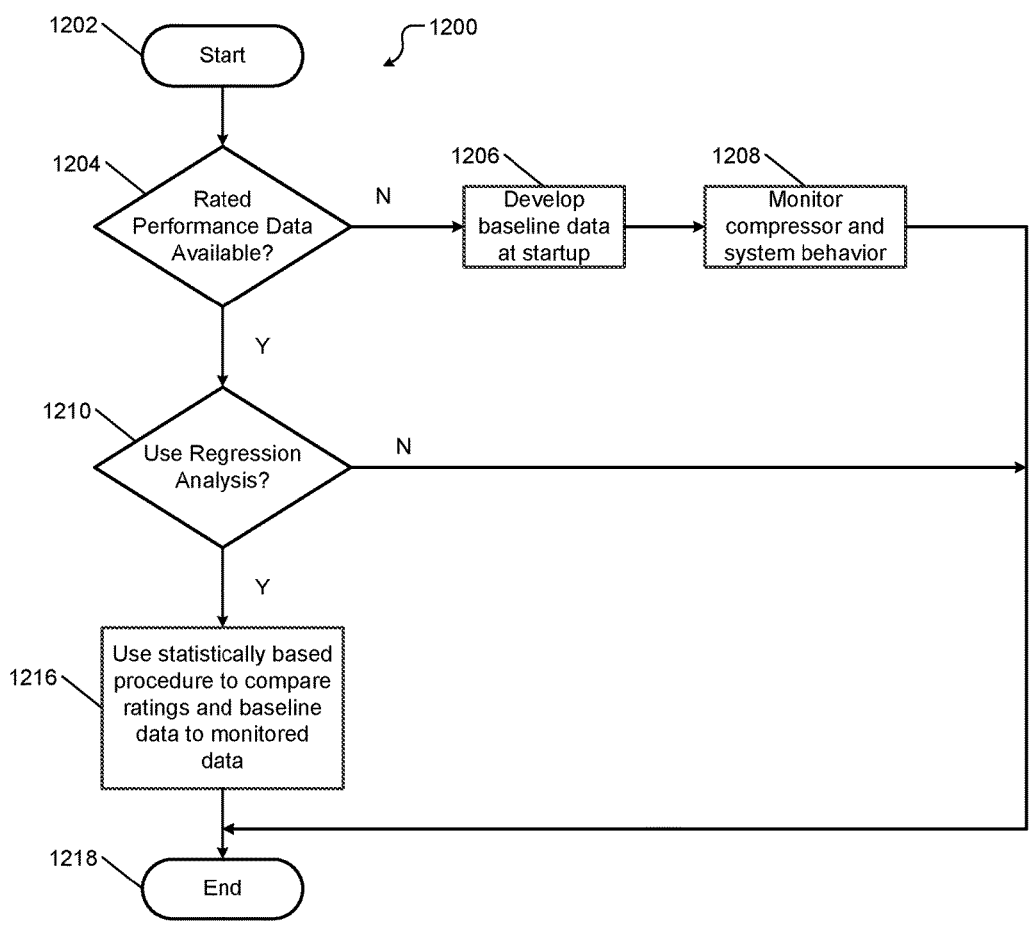
FIG. 12 is a flowchart of an example operation in tracking performance of compressors of the refrigeration system of FIG. 1.
Figure 13:
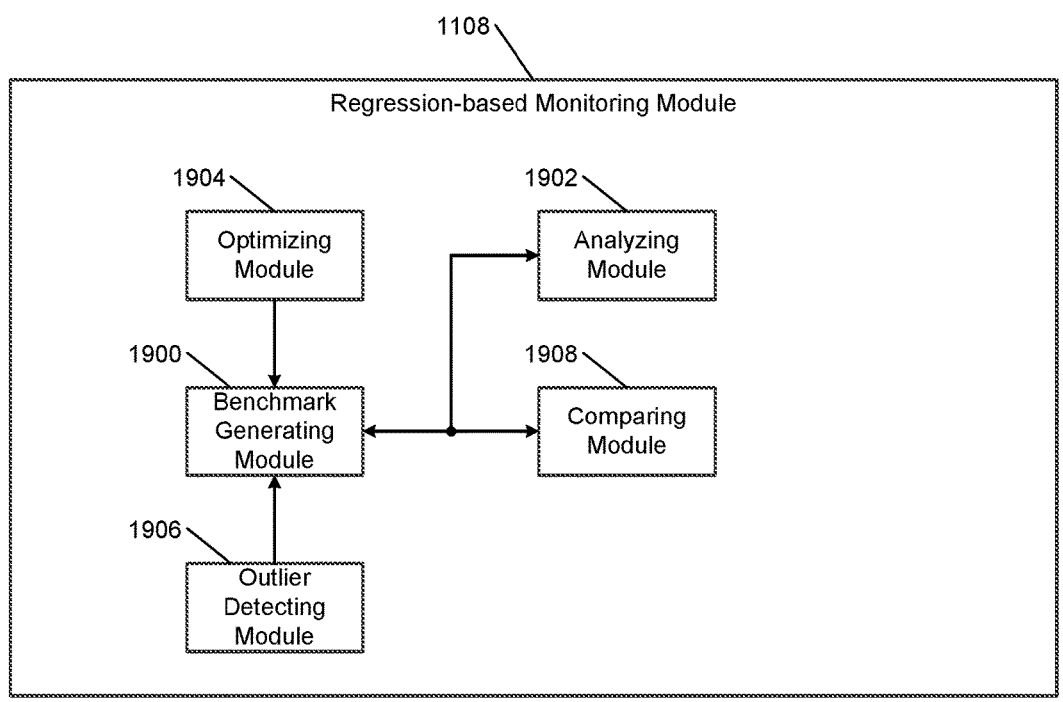
FIG. 13 is a block diagram of an example regression-based system for tracking performance of compressors of the refrigeration system of FIG. 1.
Figure 14:
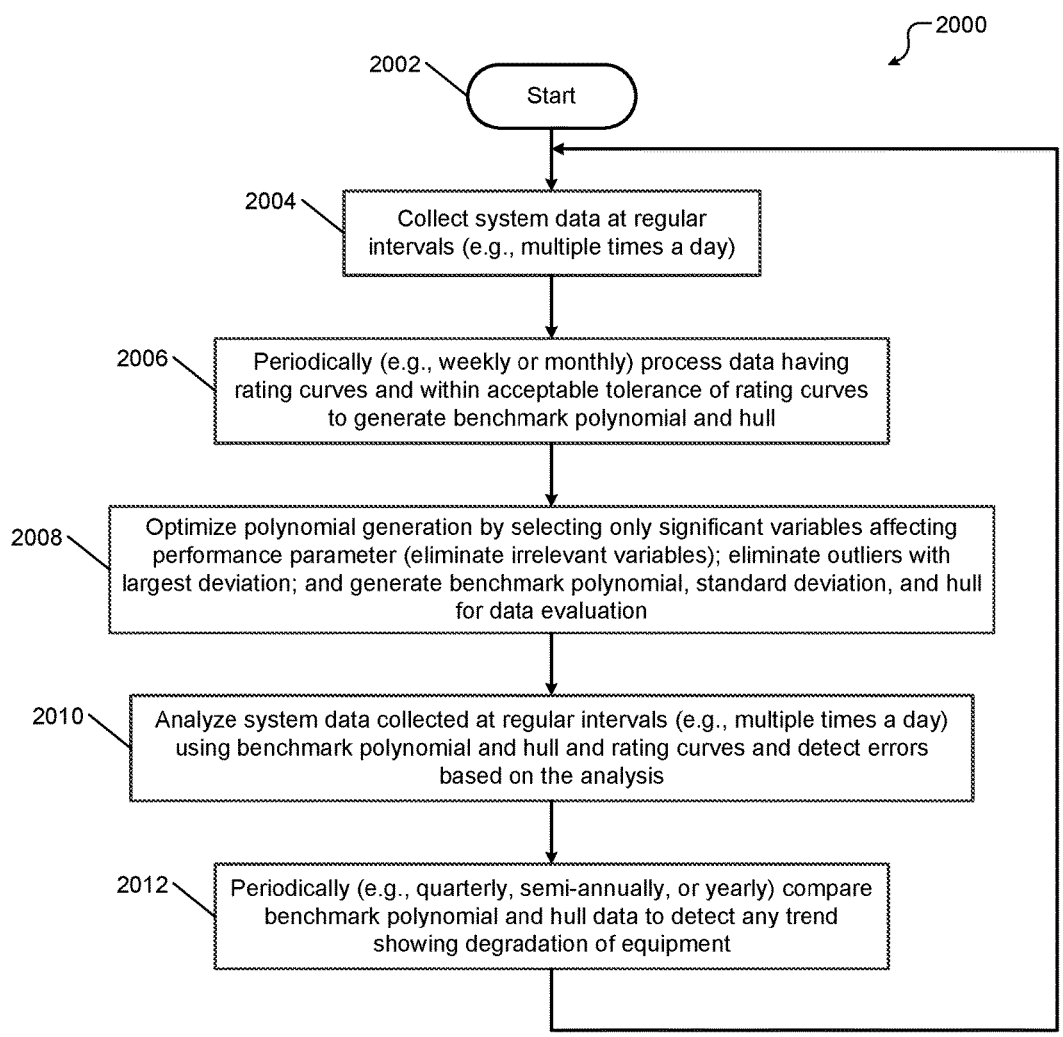
FIG. 14 is a flowchart of an example operation in regression-based performance tracking of compressors of the refrigeration system of FIG. 1.

The various aspects of the present disclosure described above are now described in further detail below. The disclosure below is organized as follows. FIGS. 9A, 9B, and 10 illustrate power monitoring of individual compressors 12 in the compressor rack 14 shown in FIG. 1. FIGS. 11 and 12 illustrate systems and methods for tracking performance of individual compressors 12. FIGS. 13 and 14 illustrate a system and method for regression-based monitoring of compressor performance. FIGS. 15A-16E illustrate systems and methods for providing steady-state liquid flood-back protection in compressors. FIGS. 17A and 17B illustrate a system and method for compressor identification useful in controlling and diagnosing a compressor.

With reference to FIGS. 9A and 9B, an example of a system 900 for monitoring power consumption of individual compressors 12 in the compressor rack 14 of FIG. 1 is shown. In FIG. 9A, the system 900 is implemented in the system controller 70 shown in FIG. 1. The system controller 70 includes a power monitoring module 902 and a performance tracking module 904. The power monitoring module 902 monitors the power consumption of individual compressors 12 in the compressor rack 14. The performance tracking module 904 tracks the performance of the individual compressors 12 based on the power consumption monitored by the power monitoring module 902. The performance tracking module 904 also diagnoses the health of the individual compressors 12 based on the power consumption monitored by the power monitoring module 902 and the performance tracked by the performance tracking module 904. Accordingly, the power monitoring and performance tracking can be used for both energy management and maintenance and diagnostics of the refrigeration system 10.

As used herein, diagnosing health of a component of the refrigeration system such as a compressor includes the following: detecting an actual and/or probable malfunction of the component; determining whether the operation of the component conforms to one or more manufacturer's ratings for the component; detecting and/or determining a fault condition associated with the component; predicting and/or estimating any of the above; predicting and/or estimating fault-free operational duration (useful life) for the component; and providing tangible indications or alerts regarding the above.

In FIG. 9B, an example of the power monitoring module 902 is shown. The power monitoring module 902 includes a power consumption module 906, a voltage determining module 908, a power factor module 910, and an error correction module 912. The power consumption module 906 determines the power consumption of each compressor 12 in different ways depending on the type of data available. For example, if each compressor 12 has a power meter associated with it, the power consumption module 906 determines the power consumption of each compressor 12 directly from the power consumption data received from the power meter associated with the respective compressor 12. If, however, a power meter is not available for each compressor 12, the power consumption module 906 determines the power consumption of each compressor 12 in one of two ways.

In a first way, the voltage determining module 908 determines a supply voltage available for each compressor 12 based on the power supplied to the compressor rack 14 by the power supply 32 (shown in FIG. 1) and a number of compressors 12 in the compressor rack 14. The power factor module 910 adjusts a power factor for a particular compressor 12 based on the supply voltage for the particular compressor 12 determined by the voltage determining module 908. The power factor for the particular compressor 12 changes due to changes in operating conditions (e.g., load) of the particular compressor 12 and changes in the supply voltage for the particular compressor 12. The power factor module 910 adjusts the power factor for the particular compressor 12 to compensate for differences between the actual supply voltage for the particular compressor 12 (e.g., 240V or 220V) and a voltage rating of the particular compressor 12 (e.g., 230V).

The power factor module 910 adjusts the power factor for the particular compressor 12 using the formula (or other PF correction formula applicable to the compressor) $PF = Volts_{rating} * PF_{rating} * (Amps_{nominal-rating} / Amps_{actual}) / Volts_{actual}$, where $Volts_{rating}$ denotes the voltage rating of the particular compressor 12, $PF_{rating}$ denotes a power factor rating of the particular compressor 12, $Amps_{nominal-rating}$ denotes an amperage or a current rating of the particular compressor 12, $Amps_{actual}$ denotes an actual current consumption of the particular compressor 12, and $Volts_{actual}$ denotes the actual supply voltage for the particular compressor 12 determined by the voltage determining module 908.

The power consumption module 906 determines the power consumption of the particular compressor 12 based on the adjusted or corrected power factor determined by the power factor module 910. The power consumption module 906 determines the power consumption of the particular 3-phase (for example) compressor 12 using the formula Power=Volts*PF*amps*3^0.5, where Volts denotes the actual supply voltage for the particular compressor 12 determined by the voltage determining module 908, PF denotes the adjusted or corrected power factor determined by the power factor module 910, and amps denotes the actual amperage of the particular compressor 12.

In a second way, the error correction module 912 determines an error correction factor in the event that the supply voltage for the particular compressor 12 is unknown but the total power consumption of the compressor rack 14 is known (e.g., from the rack power sensor 34 shown in FIG. 1). The power consumption of each individual compressor 12 is calculated based on the actual amperage, rated voltage, and rated power factor of each compressor 12. The correction factor is applied to the individual power consumption values of each compressor 12 such that the sum of the power consumption values of the individual compressors (plus fans and other loads) equals the measured total power consumption of the compressor rack 14.

With reference to FIG. 10, an example of a control algorithm 1000 for monitoring power consumption of individual compressors 12 in the compressor rack 14 is shown. For example, the control algorithm 1000 may be performed by the system controller 70 shown in FIG. 1. The control algorithm 1000 starts at 1002. At 1004, the system controller 70 determines whether power consumption data for a particular compressor 12 is available from a power meter is associated with the particular compressor 12. If power consumption data is available from a power meter, the system controller 70 uses the power consumption data from the power meter to determine the power consumption of the particular compressor 12 at 1006.

If, however, power consumption data is unavailable from a power meter, at 1008, the system controller 70 determines whether a supply voltage for the particular compressor 12 is available. For example, the system controller 70 may determine the supply voltage for a particular compressor 12 based on the power supplied by the power supply 32 to the compressor rack 14 and the number of compressors 12 in the compressor rack 14 (see FIG. 1).

If the system controller 70 can determine the supply voltage for the particular compressor 12, at 1010, the system controller 70 adjusts or corrects a power factor for the particular compressor 12 based on the supply voltage to compensate for difference between the actual supply voltage for the particular compressor 12 and a voltage rating of the particular compressor 12. For example, the system controller 70 adjusts or corrects the power factor for the particular compressor 12 using the formula disclosed above in the description of the power factor module 910 with reference to FIGS. 9A and 9B. At 1012, the system controller 70 determines the power consumption of the particular compressor 12 based on the adjusted or corrected power factor and actual supply voltage and amperage of the particular compressor 12. For example, the system controller 70 determines the power consumption of the particular compressor 12 using the formula disclosed above in the description of the power consumption module 906 with reference to FIGS. 9A and 9B.

If the supply voltage for the particular compressor 12 is unavailable, at 1014, the system controller 70 estimates the power consumption of the particular compressor 12 using the amperage of the particular compressor 12 and the voltage rating and the rated power factor of the particular compressor 12. If a power meter (e.g., the rack power sensor 34 shown in FIG. 1) measures an aggregate power consumption of the compressor rack 14, an error correction factor is applied such that sum of power consumption of individual compressors (plus fans and other loads) equals aggregate power consumption.

At 1016, the system controller 70 uses the power consumption determined as described above to track the performance and diagnose the health of the particular compressor 12. The system controller 70 determines the power consumption of each of the compressors 12 and tracks the performance and diagnoses the health of each of the compressors 12 as described above. The control algorithm 1000 ends at 1018.

With reference to FIG. 11, an example of a system 1100 for tracking performance of the compressors 12 in the compressor rack 14 of FIG. 1 is shown. The system 1100 can be generally implemented in the system controller 70 shown in FIG. 1 and can be specifically implemented in the performance tracking module 904 shown in FIGS. 9A and 9B. The performance tracking module 904 determines whether the performance of the compressors 12 conforms to the manufacturer's rated performance. The performance tracking module 904 includes a baseline data module 1102, a performance monitoring module 1104, and a regression-based monitoring module (regression module) 1108. The operation of these modules is explained below in brief with reference to FIG. 12.

Briefly, if rated performance data for the compressor 12 is unavailable, the performance tracking module 904 generates baseline data for the compressor 12 and assesses the performance and diagnoses the health of the compressor 12 by comparing operational data of the compressor 12 to the baseline data for the compressor 12. If, however, the rated performance data for the compressor 12 is available, the performance tracking module 904 assesses the performance and diagnoses the health of the compressor 12 by comparing the operational data of the compressor 12 to the rated performance data for the compressor 12.

The baseline data module 1102 generates the baseline data for the compressor 12 based on data received from the compressor 12 immediately following installation of compressor 12. The performance monitoring module 1104 assesses the performance and diagnoses the health of the compressor 12 by comparing the baseline data to the operational data of the compressor 12 obtained subsequent to developing the baseline data for the compressor 12.

The regression-based monitoring module 1108 performs a regression analysis on the rated performance data and the data obtained from the compressor 12 during operation and assesses the performance and diagnoses the health of the compressor 12 based on the regression analysis.

With reference to FIG. 12, an example of a control algorithm 1200 for tracking performance of the compressors 12 and the compressor rack 14 of FIG. 1 is shown. For example, the control algorithm 1200 may be performed generally by the system controller 70 shown in FIG. 1 and specifically by the performance tracking module 904 shown in FIG. 11. The control algorithm 1200 is explained below in brief. A detailed description of the modules of FIG. 11 and the control algorithm 1200 follows thereafter.

The control algorithm 1200 starts at 1202. At 1204, the performance tracking module 904 determines whether rated performance data for the compressors 12 is available. If the rated performance data for the compressors 12 is unavailable, the baseline data module 1102 generates baseline data for each compressor 12 at startup following installation at 1206. At 1208, the performance monitoring module 1104 uses the baseline data generated by the baseline data module 1102 as reference and compares data obtained during operation with the baseline data to monitor and assess the performance and to diagnose the health of the compressor 12.

If, however, the rated performance data for the compressors 12 is available, at 1210, the performance tracking module 904 determines whether other methods including but not limited to regression-based analysis is used to monitor and assess the performance and diagnose the health of the compressor 12. If regression-based analysis is used, at 1216, the regression module 1108 uses statistically based procedures to compare ratings and baseline data to monitored data in order to assess compressor and system behavior and health. The control algorithm 1200 ends at 1218.

With reference to FIG. 13, an example of the regression-based monitoring module 1108 is shown in further detail. The regression-based monitoring module 1108 can monitor performance of compressor, condenser, evaporator, or any other system component for which performance data is available. Therefore, while the operation of the regression-based monitoring module 1108 is described below with reference to the compressor 12 for example only, the teachings of the present disclosure can also be applied to monitor the performance and diagnose health of other system components.

The regression-based monitoring module 1108 includes a benchmark generating module 1900, an analyzing module 1902, an optimizing module 1904, an outlier detecting module 1906, and a comparing module 1908. The operation of these modules is described below in detail with reference to FIG. 14.

Briefly, the regression-based monitoring module 1108 performs a regression analysis on the rated performance data and the data obtained from the compressor 12 during operation, and assesses the performance and diagnoses the health of the compressor 12 based on the regression analysis as follows. The benchmark generating module 1900 generates a benchmark polynomial and a benchmark hull. The analyzing module 1902 analyzes data obtained from the compressor 12 during operation using the benchmark polynomial and the benchmark hull and assesses the performance and diagnoses the health of the compressor 12 based on the analysis.

The optimizing module 1904 selects only statistically significant variables affecting a selected one of the rated performance data (e.g., power consumption of the compressor 12) and eliminates statistically insignificant variables that do not significantly affect the selected one of the rated performance data (e.g., power consumption of the compressor 12). The optimizing module 1904 optimizes the benchmark polynomial using the selected variables.

The outlier detecting module 1906 detects outliers in the data obtained from the compressor 12 during operation and removes outliers with largest deviation. The comparing module 1908 compares the benchmark polynomial and the benchmark hull with historical benchmark polynomial and hull data and assesses the performance and diagnoses the health of the compressor 12 based on the comparison.

In general, the regression-based monitoring module 1108 performs the following functions: data collecting and evaluation at regular intervals (e.g., multiple times a day), periodically (e.g., weekly or monthly) benchmarking and evaluation of data outside hull (explained below), and long-term evaluation (e.g., quarterly, semiannually, or yearly). The benchmarking function further includes creating a model, checking the model for validity, eliminating outliers, simplifying the model by eliminating irrelevant variables, and calculating Hull. These functions are explained below in detail.

With reference to FIG. 14, an example of a control algorithm 2000 for regression-based performance monitoring of individual compressors 12 in the compressor rack 14 is shown. For example, the control algorithm 2000 may be performed generally by the system controller 70 shown in FIG. 1, specifically by the performance tracking module 904 shown in FIG. 11, and more specifically by the regression-based monitoring module 1108 shown in FIG. 13. The control algorithm 2000 starts at 2002.

At 2004, the regression-based monitoring module 1108 collects system or compressor sensor data multiple times a day (e.g., every second, minute, hour). For example, the data may be for power consumption, mass flow rate, or any other parameter of any system component relevant for determining system performance and diagnosing system health trends.

At 2006, the benchmark generating module 1900 processes the data having rating curves and within acceptable tolerance of the rating curves. If the data is not within the acceptable tolerance of the rating curves an error or warning is generated. The data within the acceptable tolerance is stored and processed for generating benchmark polynomial and benchmark hull. Hull is a region of data points inside of which a regression formula such as a polynomial can be used for prediction. The benchmark generating module 1900 generates a model and checks the validity of the model using statistical methods.

At 2008, the optimizing module 1904 selects only statistically significant variables that affect the selected performance parameter (e.g., power consumption of the compressor 12) and eliminates statistically irrelevant variables to simplify the benchmark polynomial being generated. Additionally, the outlier detecting module 1906 detects any outliers in the data, determines whether the outliers are not noise, and removes the outliers with the largest deviation to further simplify the benchmark polynomial being generated. The outlier removal also improves the accuracy of the model. The outliers are stored in a database and are evaluated over the long-term to determine whether the outliers were caused in fact by a system problem. The optimizing module 1904 optimizes the benchmark polynomial based on the selected variables and the eliminated outliers. The optimizing module 1904 also calculates benchmark hull along with the benchmark polynomial for data evaluation.

At 2010, the analyzing module 1902 analyzes the system data being collected at regular intervals using the benchmark polynomial, the benchmark hull, and the rating curves, and detects errors based on the analysis. For example, the analyzing module 1902 compares the data to the benchmark polynomial and determines whether the data is within one or more (e.g., ±2) standard deviations of the benchmark polynomial. The analyzing module 1902 also determines whether the data is outside the benchmark hull. Further, the analyzing module 1902 determines whether the data is within an acceptable tolerance of the rating curves for the data. If the data is within the acceptable tolerance of the rating curves for the data, the data is stored and used for generating future benchmark polynomial and benchmark hull. If the data is not within the acceptable tolerance of the rating curves for the data, an error or warning regarding compressor performance and health is issued.

At 2012, the comparing module 1908 periodically (e.g., quarterly, semiannually, or yearly) compares the benchmarks to detect long-term trends, determines whether the long-term trends show any deterioration of the equipment, and issues an error or warning if the long-term trends show any deterioration of the equipment.

With reference to FIGS. 15A-16E, the following portion of the present disclosure relates to systems and methods for providing steady-state liquid flood-back protection in compressors (e.g., the compressors 12 in the compressor rack 14 shown in FIG. 1). Unintentional introduction of liquid refrigerant into a compressor can significantly degrade the reliability of the compressor. Determination of a likelihood of having liquid refrigerant in the suction gas of a compressor (flood-back) is done by determining a degree of superheat in the suction gas, or by using a discharge gas temperature to determine the suction gas condition. The suction superheat method does not easily portray the quality of the return gas if the value is less than 1, whereas the discharge temperature method can provide some insight into the degree of severity of the flooding condition. Knowing a relative rate of liquid refrigerant return is important for determining an appropriate course of action in order to protect the compressor.

Continuous flooding at a low rate may eventually lead to reduced oil viscosity and associated bearing lubrication issues, ring wear or other lubrication-type failures, but the response time to protect against this problem is relatively long. A higher rate of liquid ingestion (lower quality refrigerant) increases the risk of damage due to lubrication issues but also (and perhaps more importantly) due to the increased risk of damage from high pressures associated with the compression of liquid. The present disclosure uses the discharge temperature to determine the suction superheat, and can also define the quality of the return gas if it is less than 1.

The present disclosure also includes provisions for protecting the compressor by turning it off and re-starting with a bump-start routine. Bump start is an optional feature which provides additional flooded start protection. Bump start drives refrigerant out of the oil, preventing the refrigerant from circulating through the compressor as a liquid and washing the oil film off of the load-bearing surfaces. When bump start is enabled, the compressor is turned on for a few seconds (e.g., 2 seconds), then turned off for a few seconds (e.g., 5 seconds), and this process is repeated a few times (e.g., 3 times) before the compressor runs normally. This process allows refrigerant to exit the compressor without the oil being removed. An example of a bump-start system and method is described in detail in U.S. Pat. No. 9,194,393 issued on Nov. 24, 2015 assigned to Emerson Climate Technologies, Inc., which is incorporated herein by reference in its entirety.

The following terms are used in the flood-back protection aspect of the present disclosure.

> Quality—Mass ratio of gaseous refrigerant to the total (gas+liquid refrigerant) in the return (suction) fluid to a compressor. Quality of 1=no liquid refrigerant.

Slug—A quantity of liquid that is generally moving with the suction gas flow in the suction line of a compressor, ultimately entering the compressor. A "slug" generally refers to a condition whereby the bulk density of the suction flow is rapidly increasing due to larger volumetric percentages of liquid. This event is often associated with the termination of a defrost cycle, and is hence called a "defrost protection" routine (although defrost termination may not be the sole cause of this phenomenon).

Flood-back—A quality of suction refrigerant less than 1 (i.e., some continuous return of liquid). This term describes a less rapidly changing scenario than when a compressor is "slugged".

DLT—discharge line temperature. Ideally this is the port, head or top-cap temperature of a compressor.

dT/dt—Rate of change of temperature with respect to time.

One embodiment of the present invention calculates a minimum allowable discharge temperature, representing a temperature that will be developed by a compressor if the compressor is running with no superheat in the suction gas. The design of the compressor determines whether or not "zero" superheat is a true minimum. For some compressors this may be overly conservative, while for others this may not provide enough safety margin. Regardless, the process can be applied for any desired return gas superheat or flood-back quality.

The inputs required to generate minimum allowable discharge temperature include compressor efficiency, refrigerant properties, and operating pressures (e.g., discharge pressure, suction pressure, and return gas temperature). The method includes consideration of factors including whether the compressor is operating digitally, and whether liquid injection is being used for cooling the compressor and for modulating the capacity of the compressor.

One embodiment uses the remote controller 74 (shown in FIG. 1) to perform the minimum DLT calculation when the remote controller 74 has system operating condition information. The compressor controller 20 (shown in FIG. 1) receives communication updates from the remote controller 74 via the system controller 70 and decides whether to shut down the compressor 12 (shown in FIG. 1) and whether to restart the compressor 12 using a bump start method.

In alternate embodiments, the calculation of the minimum DLT can be done in the compressor controller 20 (or in the system controller 70) if sensor inputs and information are available. Notification of the detection of liquid, even if it is not severe enough to warrant turning off the compressor, can be part of the learning process to optimize the controls and settings for flood-back protection.

The systems and methods for providing steady-state liquid flood-back protection according to the present disclosure include a methodology that can be applied generically to many refrigeration compressors using dynamic (real time) system operating conditions (pressures or saturated temperatures) for generation of a minimum safe operating discharge line temperature. The temperature calculation can be adjusted dynamically (in real time) to provide more or less safety margin based on the design considerations of the compressor.

Figure 15A:
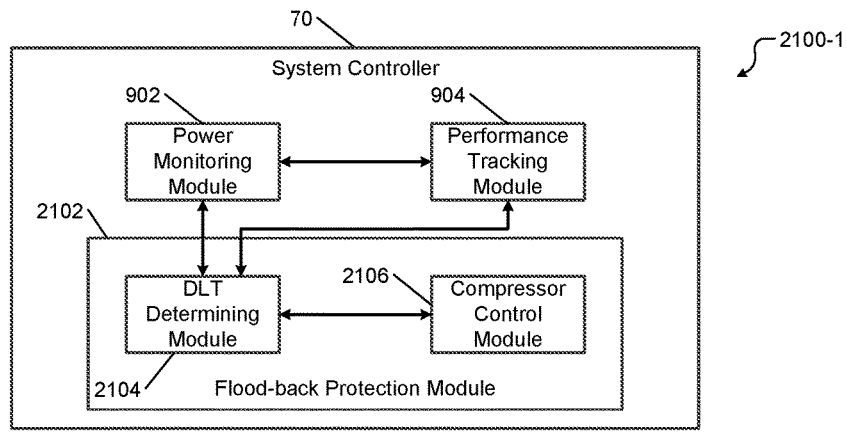
FIGS. 15A-15C are block diagrams of examples of flood-back protection systems for compressors of the refrigeration system of FIG. 1.

FIGS. 15A-16E show examples of the systems and methods for providing steady-state liquid flood-back protection in compressors according to the present disclosure. FIG. 15A shows an example of implementing the system for providing steady-state liquid flood-back protection in the system controller 70 (shown in FIG. 1). FIG. 15B shows an example of implementing the system for providing steady-state liquid flood-back protection in the remote controller 74 (also shown in FIG. 1). FIG. 15C shows an example of implementing the system for providing steady-state liquid flood-back protection in the compressor controller 20 (also shown in FIG. 1). FIGS. 16A-16E show examples of performing minimum DLT computation and flood-back protection.

It should be noted that the tasks of performing minimum DLT computation and flood-back protection can be partially or fully implemented individually or in any shared manner between the system controller 70, the remote controller 74, and the compressor controller 20. For example, in some implementations, the remote controller 74 may perform the minimum DLT computation and may determine whether to shut down the compressor 12 and whether to restart the compressor 12 using bump start. In some implementations, the remote controller 74 may directly control the compressor 12 (e.g., by accessing the compressor 12 via the system controller 70). In some implementations, the remote controller 74 may send the minimum DLT computation and instructions for shutting down and restarting the compressor 12 to the system controller 70 or the compressor controller 20, which in turn may control the compressor 12 accordingly. In some implementations, the system controller 70 and or the compressor controller 20 may perform the minimum DLT computation and decide how to shut down and restart the compressor 12.

Figure 16A:
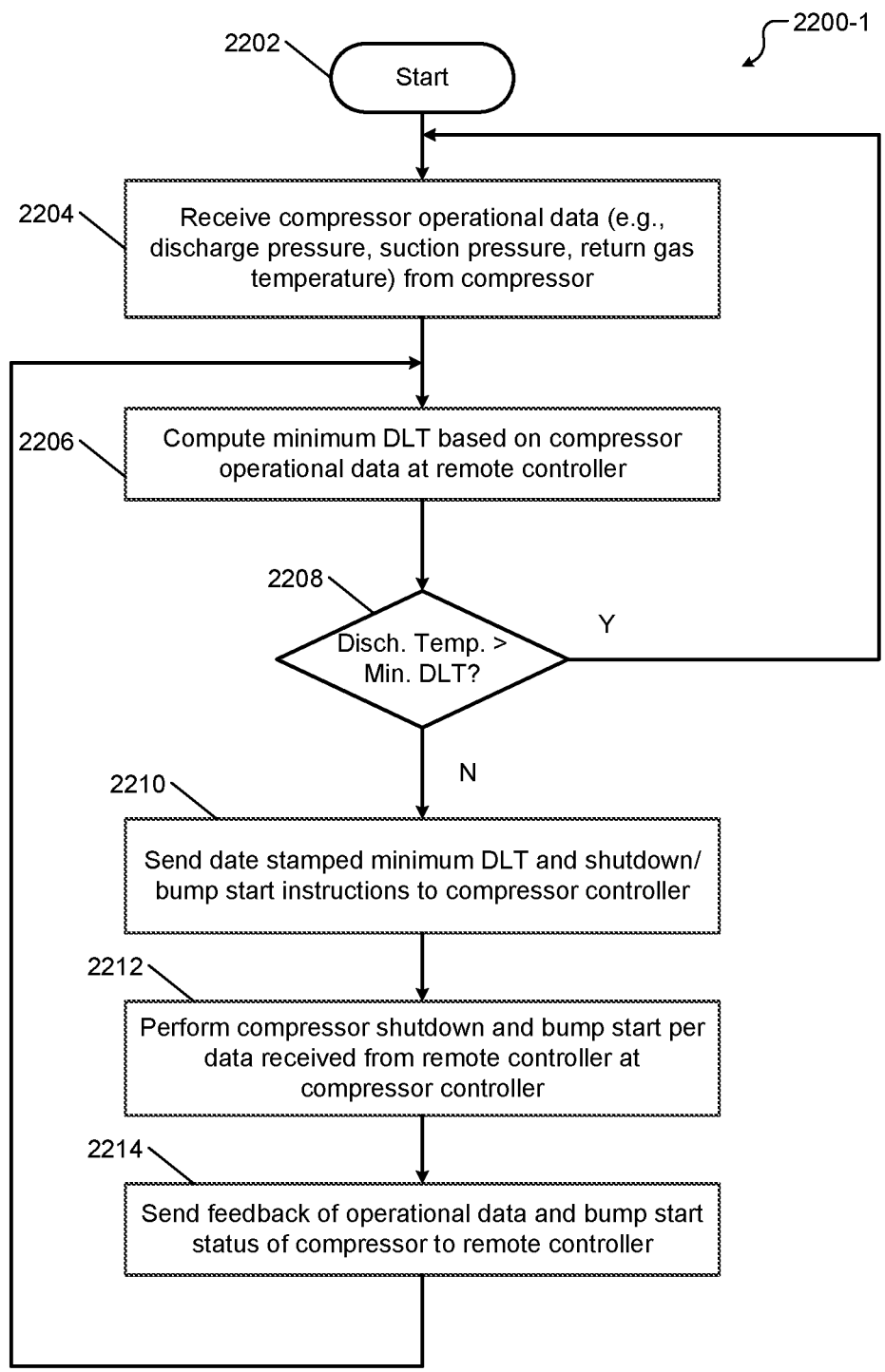
FIGS. 16A-16E are flowcharts of example operations in providing flood-back protection for compressors of the refrigeration system of FIG. 1.
Figure 16B:
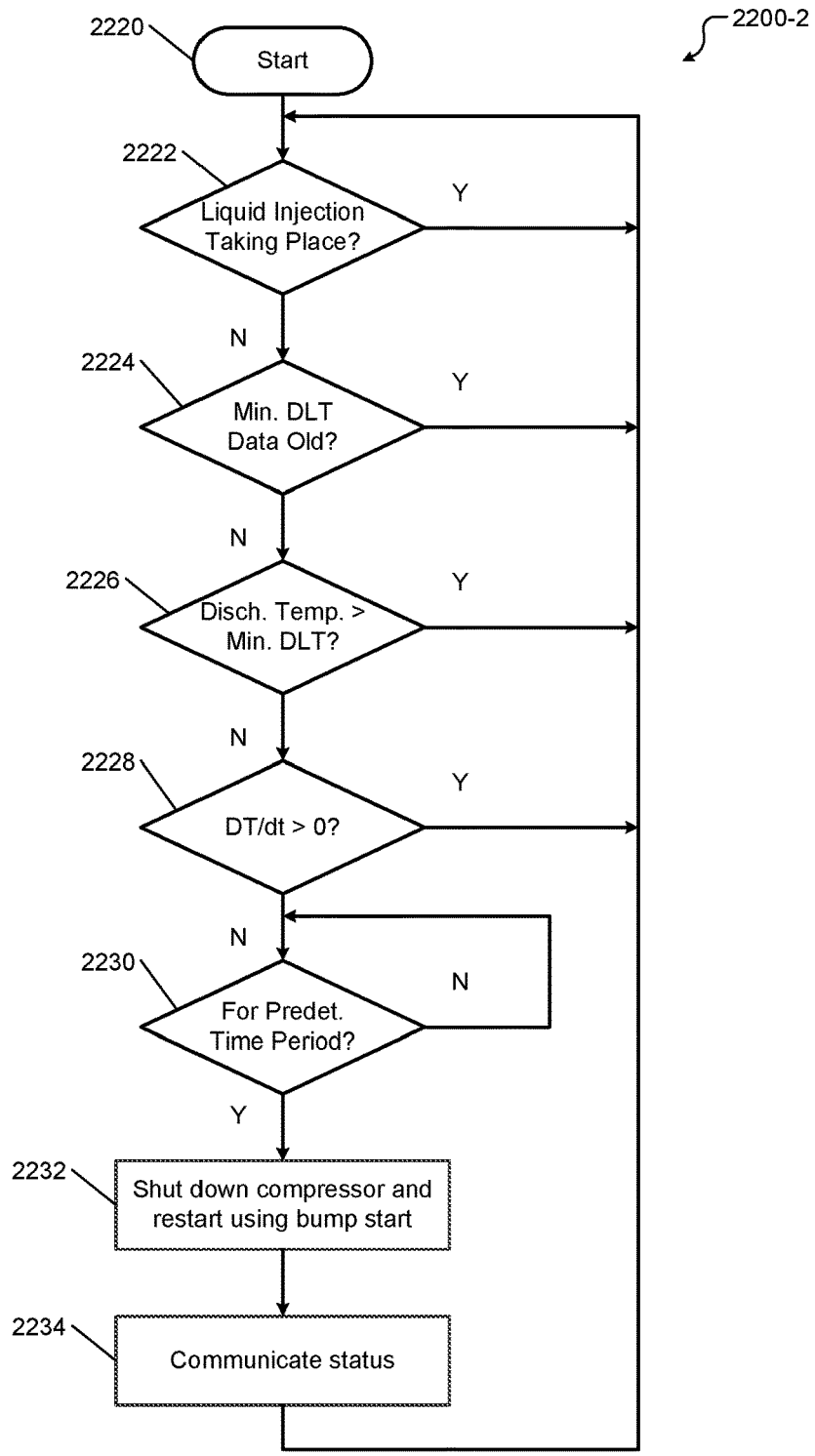
Figure 16C:
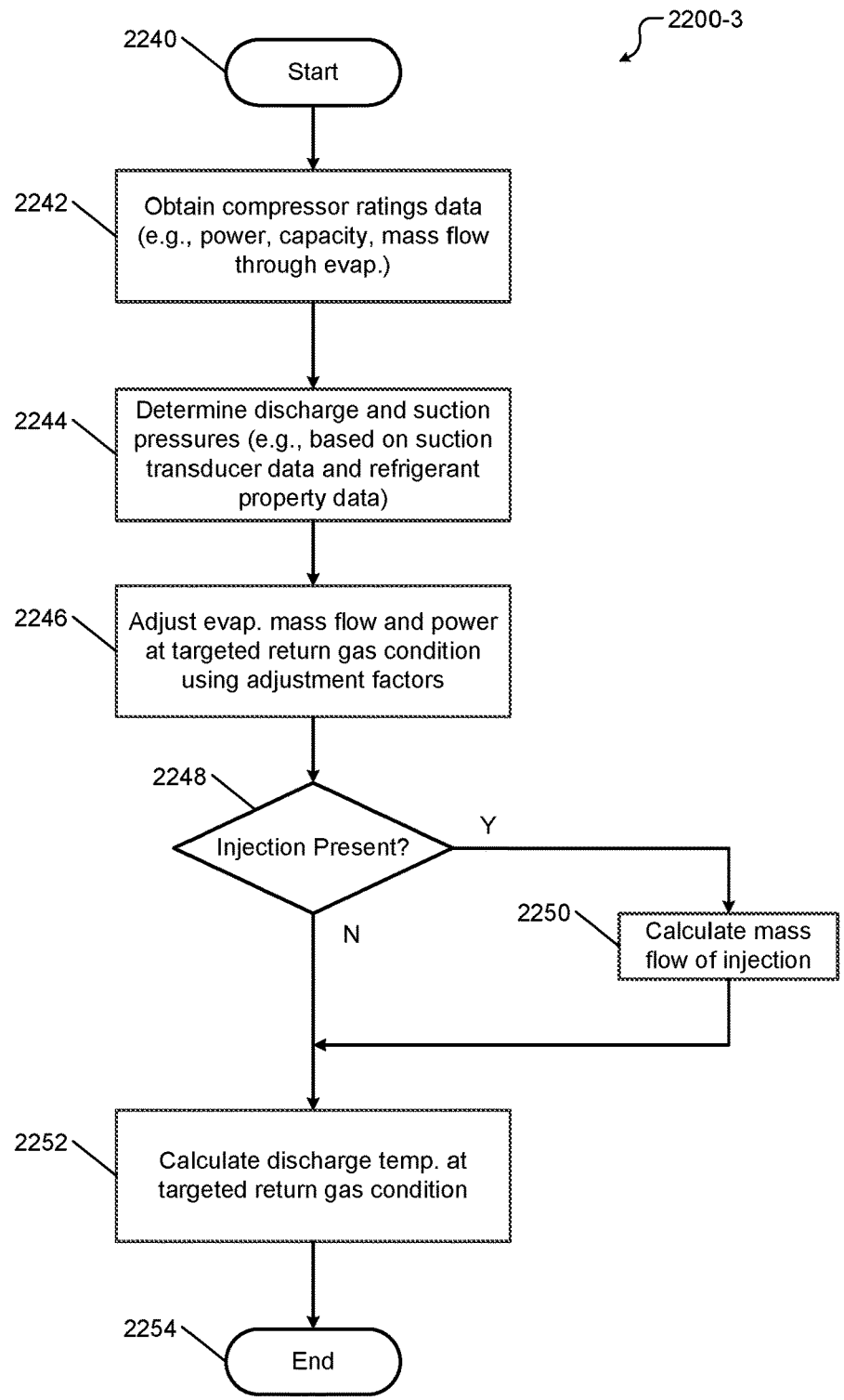
Figure 16D:
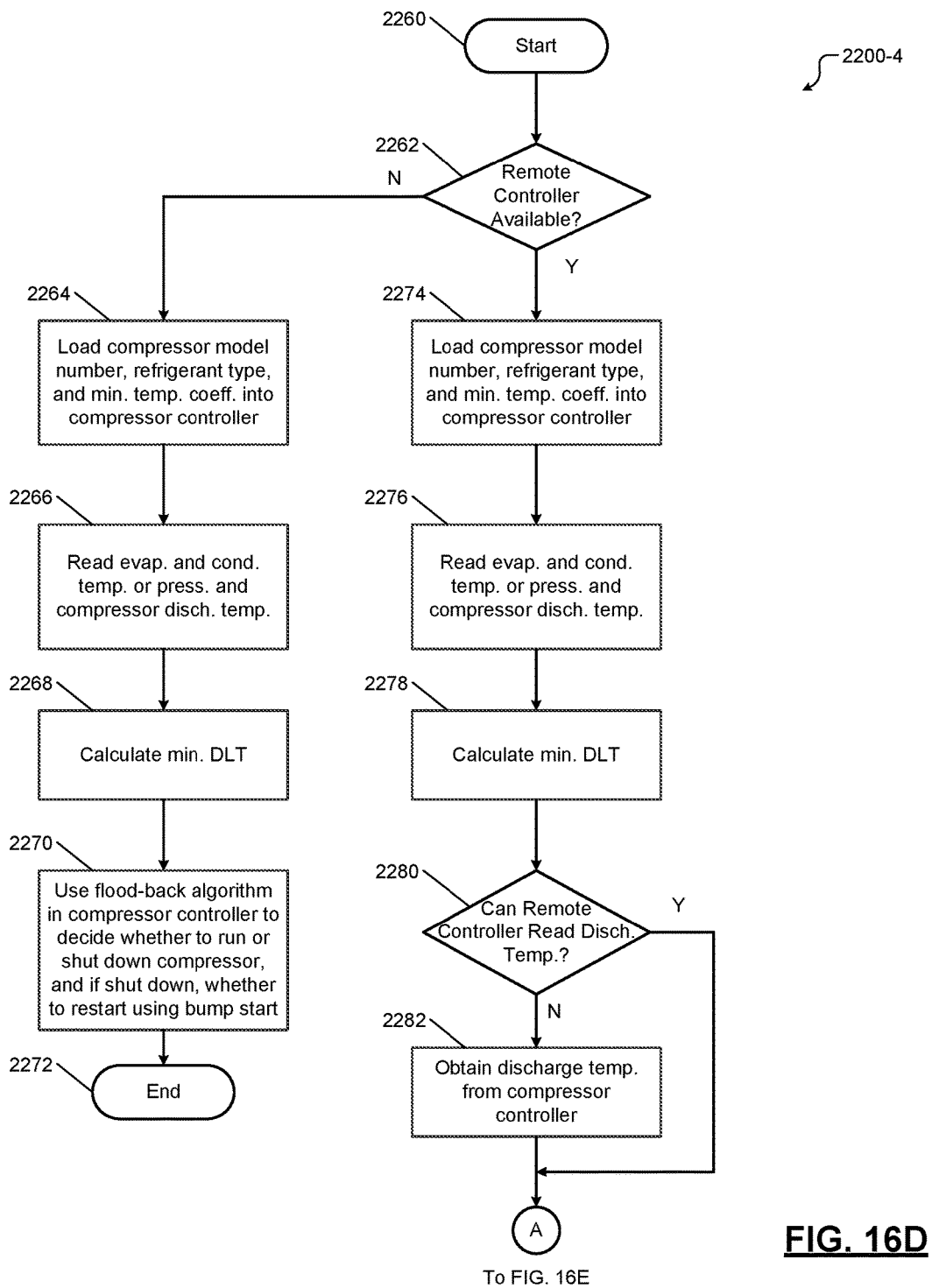
Figure 16E:
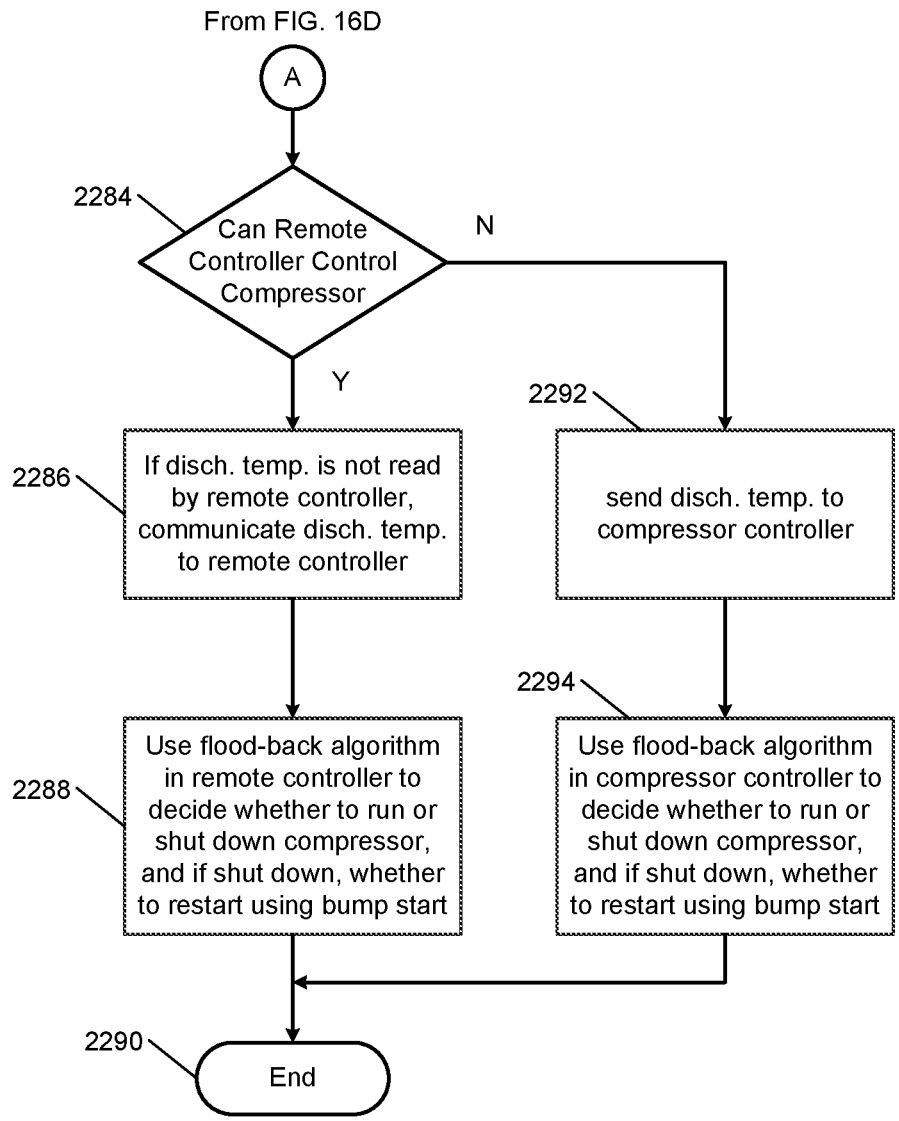
Figure 17A:
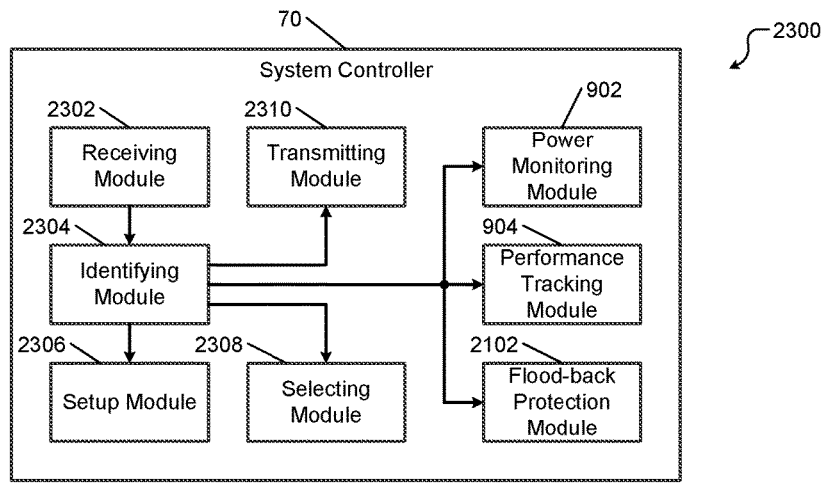
FIG. 17A is a block diagram of an example compressor identification system.
Figure 17B:
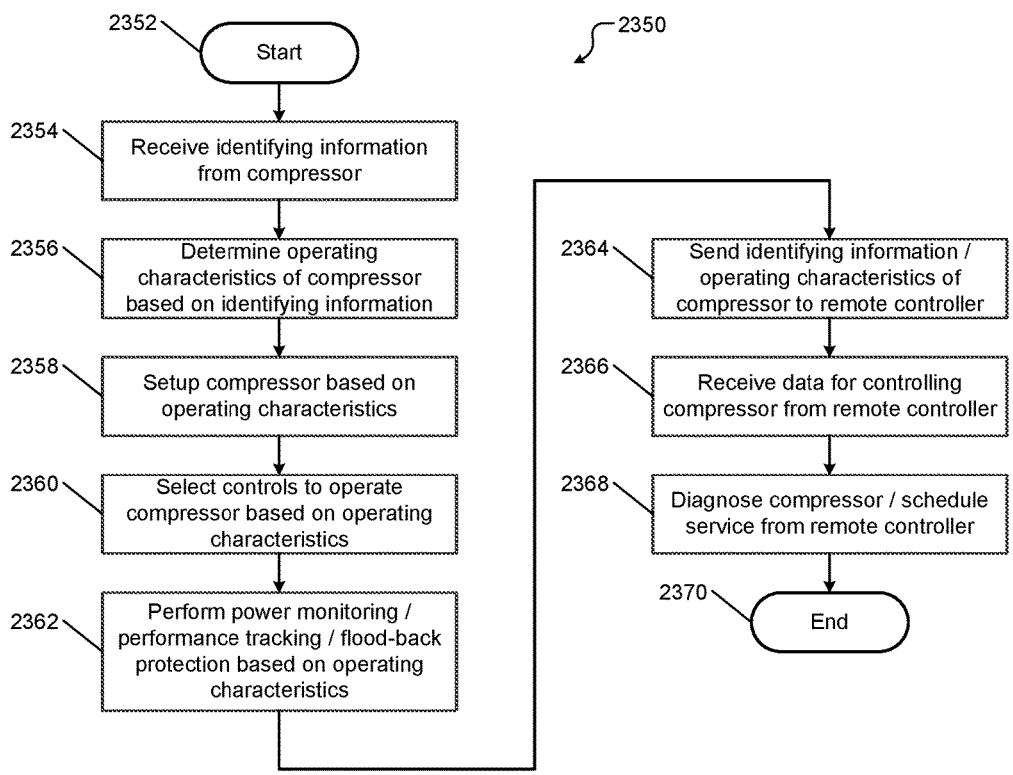
FIG. 17B is a flowchart of an example operation in compressor identification.

FIG. 16A shows an example of a method for computation of the minimum DLT in the remote controller 74 and communication of that information to the compressor controller 20 for flood-back protection. FIG. 16B shows an example of a control algorithm performed by the compressor controller 20 for decision making regarding flood-back protection. FIG. 16C shows an example of the inputs required for generating the minimum allowable discharge temperature and the associated thermodynamic calculations involved. FIGS. 16D and 16E show an example of an embodiment using a remote, system based controller (e.g., the remote controller 74) for calculating the minimum DLT, and then communicating the minimum DLT to the compressor controller 20 for decision making and flood-back protection.

With reference to FIG. 15A, an example of a flood-back protection system 2100-1 implemented in the system controller 70 is shown, where the system controller 70 includes a flood-back protection module 2102. The flood-back protection module 2102 includes a DLT determining module 2104 and a compressor control module 2106.

The DLT determining module 2104 monitors a plurality of operating parameters of the compressor 12 in the compressor rack 14 during operation of the compressor 12. For example, the plurality of operating parameters of the compressor 12 may include but are not limited to a discharge pressure, a suction pressure, and a return gas temperature of the compressor 12. For example, the DLT determining module 2104 may receive in real time the plurality of operating parameters from one or more of the power monitoring module 902 and the performance tracking module 904, which are described above in detail with reference to FIGS. 9A-14. Based on the plurality of operating parameters, the DLT determining module 2104 determines a minimum discharge line temperature of the compressor 12. The DLT determining module 2104 also periodically updates the minimum discharge line temperature based on the plurality of parameters obtained in real time to adjust the minimum discharge line temperature according to the present operating conditions of the compressor 12.

The compressor control module 2106 determines whether to shut down the compressor 12 by comparing a present discharge line temperature of the compressor 12 to the minimum discharge line temperature. For example, the compressor control module 2106 may determine whether the present discharge line temperature of the compressor 12 is less than or equal to the minimum discharge line temperature for a predetermined period of time (e.g., 20 seconds). Additionally, the compressor control module 2106 may determine whether a rate of change of the discharge line temperature is less than or equal to a predetermined threshold (e.g., 0) for the predetermined period of time (e.g., 20 seconds). The compressor control module 2106 may decide to shut down the compressor 12 if the present discharge line temperature of the compressor 12 is less than or equal to the minimum discharge line temperature and if the rate of change of discharge line temperature is less than or equal to the predetermined threshold for the predetermined period of time (e.g., 20 seconds). Additionally, the compressor control module 2106 determines whether the compressor 12 should be restarted using a bump start process (e.g., see U.S. Pat. No. 9,194,393 cited above).

Further, the compressor control module 2106 may determine whether any liquid injection is presently taking place in the compressor 12 (e.g., for cooling the compressor 12 and/or for modulating the capacity of the compressor 12). The compressor control module 2106 does not shut down the compressor 12 if liquid injection is presently taking place in the compressor 12.

Figure 15B:
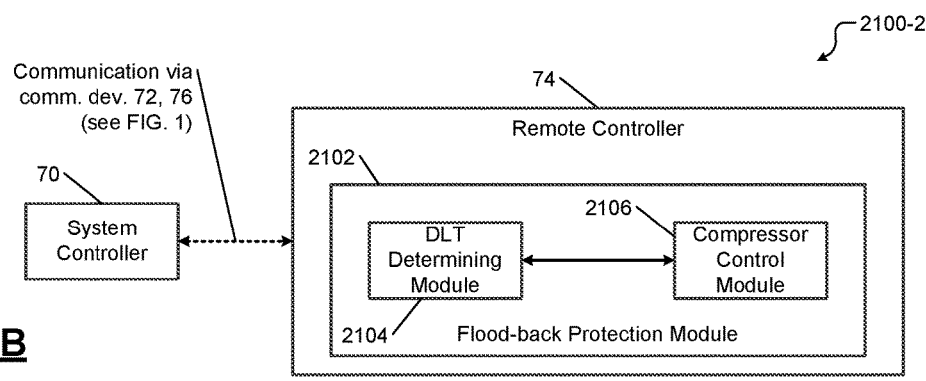

With reference to FIG. 15B, an example of a flood-back protection system 2100-2 implemented in the remote controller 74 is shown, where the remote controller 74 includes the flood-back protection module 2102. The flood-back protection module 2102 includes the DLT determining module 2104 and the compressor control module 2106.

The DLT determining module 2104 in the remote controller 74 receives a plurality of operating parameters of the compressor 12 in the compressor rack 14 during operation of the compressor 12. For example, the DLT determining module 2104 periodically receives the plurality of operating parameters from the system controller 70 (or the compressor controller 20). For example, the DLT determining module 2104 may receive the plurality of operating parameters from one or more of the power monitoring module 902 and the performance tracking module 904, which are described above in detail with reference to FIGS. 9A-14. For example, the plurality of operating parameters of the compressor 12 may include but are not limited to a discharge pressure, a suction pressure, and a return gas temperature of the compressor 12. Based on the plurality of operating parameters, the DLT determining module 2104 determines a minimum discharge line temperature of the compressor 12. The DLT determining module 2104 also periodically updates the minimum discharge line temperature based on the most recently obtained plurality of parameters from the system controller 70 (or the compressor controller 20) to adjust the minimum discharge line temperature according to the present operating conditions of the compressor 12.

The compressor control module 2106 in the remote controller 74 determines whether to shut down the compressor 12 by comparing a present discharge line temperature of the compressor 12 to the minimum discharge line temperature. For example, the compressor control module 2106 may determine whether the present discharge line temperature of the compressor 12 is less than or equal to the minimum discharge line temperature for a predetermined period of time (e.g., 20 seconds). Additionally, the compressor control module 2106 may determine whether a rate of change of the discharge line temperature is less than or equal to a predetermined threshold (e.g., 0) for the predetermined period of time (e.g., 20 seconds). The compressor control module 2106 may decide to shut down the compressor 12 if the present discharge line temperature of the compressor 12 is less than or equal to the minimum discharge line temperature and if the rate of change of discharge line temperature is less than or equal to the predetermined threshold for the predetermined period of time (e.g., 20 seconds). Additionally, the compressor control module 2106 determines that the compressor 12 should be restarted using bump start process (e.g., as described in U.S. Pat. No. 9,194,393).

Further, the compressor control module 2106 in the remote controller 74 may determine whether any liquid injection is presently taking place in the compressor 12 (e.g., for cooling the compressor 12 and/or for modulating the capacity of the compressor 12). The compressor control module 2106 does not shut down the compressor 12 if liquid injection is presently taking place in the compressor 12.

The remote controller 74 sends the minimum discharge line temperature and data indicating whether to shut down the compressor and whether to restart the compressor 12 using bump start to the system controller 70 (or the compressor controller 20) along with a date stamp, which can be used to determine the age of the minimum discharge line temperature. The system controller 70 (or the compressor controller 20) controls the compressor 12 according to the information received from the remote controller 74 and sends feedback to the remote controller 74 regarding the actions performed on the compressor 12 and the status of the compressor 12.

Figure 15C:
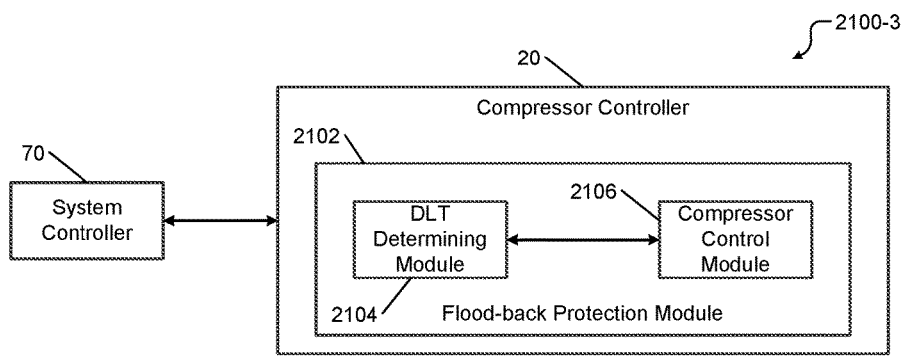

With reference to FIG. 15C, an example of a flood-back protection system 2100-3 implemented in the compressor controller 20 is shown, where the compressor controller 20 includes the flood-back protection module 2102. The flood-back protection module 2102 includes the DLT determining module 2104 and the compressor control module 2106. The operations of the flood-back protection module 2102, the DLT determining module 2104, and the compressor control module 2106 are similar to those described with reference to FIG. 15A, except that they are performed in the compressor controller 20 instead of in the system controller 70, and are not repeated for brevity.

In sum, regardless of the implementation, in general, the flood-back protection module 2102 includes the DLT determining module 2104 to determine the minimum DLT in real time and the compressor control module 2106 to determine whether to shut down the compressor 12, and if shut down, whether to restart the compressor 12 using bump start based on factors including whether the discharge temperature is less than the minimum DLT, whether liquid injection is taking place, and so on.

The discharge line temperature determining module 2104 monitors in real time a plurality of operating parameters of the compressor 12 in the compressor rack 14 during operation of the compressor 12 and determines the minimum discharge line temperature based on the plurality of operating parameters. The minimum discharge line temperature represents a discharge line temperature corresponding to liquid refrigerant entering the compressor 12. The plurality of operating parameters of the compressor includes the discharge pressure, the suction pressure, and the return gas temperature of the compressor 12. The plurality of operating parameters of the compressor 12 may also include performance data of the compressor 12 and properties of a refrigerant used in the compressor 12. The plurality of operating parameters of the compressor 12 may further include whether liquid injection is employed in the compressor 12. The discharge line temperature determining module 2104 also adjusts the minimum discharge line temperature in real time based on the plurality of operating parameters of the compressor 12.

The compressor control module 2106 shuts down the compressor 12 if the discharge line temperature of the compressor 12 is less than or equal to a minimum discharge line temperature for a predetermined period of time. The compressor control module 2106 shuts down the compressor 12 by additionally determining if the rate of change of the discharge line temperature is less than or equal to a predetermined threshold for the predetermined period of time. The compressor control module 2106 restarts the compressor 12 using a bump start method.

With reference to FIG. 16A, an example of a control algorithm 2200-1 for computing the minimum discharge line temperature and performing flood-back protection from the remote controller 74 is shown. For example, the control algorithm 2200-1 may be performed by the remote controller 74 shown in FIG. 1. The control algorithm 2200-1 starts at 2202.

At 2204, the remote controller 74 receives operational data of the compressor 12 (e.g., discharge pressure, suction pressure, and return gas temperature; whether liquid injection is used; whether the compressor 12 is digitally controlled, etc.). At 2206, the remote controller 74 computes the minimum DLT based on the operational data of the compressor 12. At 2208, the remote controller 74 determines whether the present discharge temperature of the compressor 12 is greater than the minimum DLT. The control algorithm 2200-1 returns to 2204 if the present discharge temperature of the compressor 12 is greater than the minimum DLT (or if liquid injection is taking place in the compressor 12).

If, however, the present discharge temperature of the compressor 12 is not greater than the minimum DLT, at 2210, the remote controller 74 sends data including the minimum DLT and shut down/bump start instructions to the compressor controller 20 (or the system controller 70) along with a date stamp. At 2212, the compressor controller 20 (or the system controller 70) shuts down the compressor 12 and restarts the compressor 12 using a bump start procedure according to the data received from the remote controller 74. At 2214, the compressor controller 20 (or the system controller 70) sends feedback including operational data and bump start status of the compressor 12 to the remote controller 74. The control algorithm 2200-1 returns to 2206.

With reference to FIG. 16B, an example of a control algorithm 2200-2 for providing flood-back protection from the compressor controller 20 is shown. For example, the control algorithm 2200-2 may be performed by the compressor controller 20 shown in FIG. 1. The control algorithm 2200-2 starts at 2220.

At 2222, the compressor controller 20 determines whether liquid injection is taking place in the compressor 12. The control algorithm 2200-2 takes no action if liquid injection is taking place in the compressor 12. If liquid injection is not taking place in the compressor 12, at 2224, the compressor controller 20 determines whether the minimum DLT data is old (e.g., older than 60 seconds). For example, the minimum DLT data may be periodically generated by the compressor controller 20, the system controller 70, or the remote controller 74. The control algorithm 2200-2 takes no action if the minimum DLT data is old (e.g., older than 60 seconds). If the minimum DLT data is not old (e.g., not older than 60 seconds), at 2226, the compressor controller 20 determines whether the present discharge temperature of the compressor 12 is greater than the minimum DLT. The control algorithm 2200-2 takes no action if the present discharge temperature of the compressor 12 is greater than the minimum DLT. If the present discharge temperature of the compressor 12 is not greater than the minimum DLT, at 2228, the compressor controller 20 determines whether the rate of change of discharge temperature of the compressor 12 is greater than a predetermined threshold (e.g., 0). The control algorithm 2200-2 takes no action if the rate of change of discharge temperature of the compressor 12 is greater than a predetermined threshold (e.g., 0).

If the rate of change of discharge temperature of the compressor 12 is not greater than a predetermined threshold (e.g., 0), at 2230, the compressor controller determines if the discharge temperature is not greater than the minimum DLT and the rate of change of discharge temperature is not greater than the predetermined threshold for a predetermined period of time (e.g., 20 seconds). If the discharge temperature is not greater than the minimum DLT and the rate of change of discharge temperature is not greater than the predetermined threshold for a predetermined period of time (e.g., 20 seconds), at 2232, the compressor controller 20 shuts down the compressor 12 and after a predetermined time period restarts the compressor 12 using a bump start method. At 2234, the compressor controller 20 communicates the operational data and status of the compressor 12 to the remote controller 74 and/or the system controller 70. The control algorithm 2200-2 returns to 2222.

In the predetermined period of time mentioned above with reference to flood-back protection, predetermined means an established method or algorithm. Accordingly, the predetermined period of time mentioned above with reference to flood-back protection can mean a fixed time period or a time period based on a methodology such as an inverse-time algorithm, for example. The inverse time algorithm will respond quicker if the deviation between actual DLT and minimum DLT increases in an adverse direction.

With reference to FIG. 16C, an example of a control algorithm 2200-3 for computing the minimum DLT is shown. For example, the control algorithm 2200-3 may be performed by the compressor controller 20 (preferably), the system controller 70, or the remote controller 74 shown in FIG. 1. In the following description of the control algorithm 2200-3, the term controller refers to the compressor controller 20, the system controller 70, or the remote controller 74 shown in FIG. 1. Further, the controller uses various thermodynamic computations when performing the calculations indicated. The control algorithm 2200-3 starts at 2240.

At 2242, the controller obtains the ratings data of the compressor 12 (e.g., including power consumption, capacity, mass flow through evaporator, etc.). For example, the compressor controller 20 may obtain the ratings data from the compressor 12; the system controller 70 may obtain the ratings data from the compressor controller 20; and the remote controller 74 may obtain the ratings data directly from the compressor 12, the compressor controller 20, or the system controller 70.

At 2244, the controller determines present values of discharge and suction pressures of the compressor 12 (e.g., based on suction transducer data and refrigerant property data). At 2246, the controller adjusts evaporator mass flow and power consumption at a targeted return gas condition using adjustment factors. At 2248, the controller determines whether refrigerant injection is employed by the compressor 12. If refrigerant injection is present, at 2250, the controller calculates mass flow of refrigerant injection. At 2252, the controller calculates the discharge temperature at the targeted return gas condition of the compressor 12. The control algorithm 2200-3 ends at 2254.

With reference to FIGS. 16D and 16E, an example of a control algorithm 2200-4 to calculate the minimum DLT using a remote, system based controller (e.g., the remote controller 74) and to communicate the minimum DLT to the compressor controller 20 for decision making and flood-back protection is shown. For example, the control algorithm 2200-4 may be performed partially by the remote controller 74 and partially by the compressor controller 20 shown in FIG. 1. The control algorithm 2200-4 starts at 2260.

At 2262, the availability of the remote controller 74 is determined. If the remote controller 74 is not available, at 2264, the compressor controller 20 receives data from the compressor 12 including the compressor model number, the refrigerant type, etc. At 2266, the compressor controller 20 reads evaporating and condensing temperatures or pressures, and compressor discharge temperature. At 2268, the compressor controller 20 calculates the minimum DLT of the compressor 12. At 2270, using a flood-back algorithm, the compressor controller 20 decides whether to continue to run or shut down the compressor 12; and if shut down, whether to restart the compressor 12 using a bump start method. The control algorithm 2200-4 ends at 2272.

If, however, the remote controller 74 is available, at 2274, the remote controller 74 obtains data including the compressor model number, the refrigerant type, etc. (e.g., directly from the compressor 12, the compressor controller 20 or the system controller 70). At 2276, the remote controller 74 receives evaporating and condensing temperatures or pressures, and compressor discharge temperature (e.g., from the compressor controller 20 and the system controller 70). At 2278, the remote controller 74 calculates the minimum DLT of the compressor 12.

At 2280, whether the remote controller 74 can directly read compressor discharge temperature from the compressor 12 is determined. If the remote controller 74 cannot directly read compressor discharge temperature from the compressor 12, at 2282, the remote controller 74 obtains the discharge temperature from the compressor controller 20.

At 2284, whether the remote controller 74 can control the compressor contactor is determined. If the remote controller 74 can control the compressor contactor, at 2286, if the discharge temperature is not read by the remote controller 74, the discharge temperature is communicated to the remote controller 74 by the compressor controller 20 or by the system controller 70, for example. At 2288, using a flood-back algorithm, the remote controller 74 decides whether to continue to run or shut down the compressor 12; and if shut down, whether to restart the compressor 12 using a bump start method. The control algorithm 2200-4 ends at 2290.

If, however, the remote controller 74 cannot control the compressor contactor, at 2292, the remote controller 74 sends the discharge temperature to the compressor controller 20. At 2294, using a flood-back algorithm, the compressor controller 20 decides whether to continue to run or shut down the compressor 12; and if shut down, whether to restart the compressor 12 using a bump start method. The control algorithm 2200-4 ends at 2290.

With reference to FIG. 17A, an example of a system 2300 for compressor identification implemented in the system controller 70 is shown. The system controller 70 includes a receiving module 2302, and identifying module 2304, a set up module 2306, a selecting module 2308, and a transmitting module 2310. Additionally, the system controller 70 includes the power monitoring module 902, the performance tracking module 904, and the flood-back protection module 2102, which are shown and described above with reference to FIGS. 9A-16E. These modules are described below in detail with reference to FIG. 17B.

Briefly, the receiving module 2302 receives identification information of the compressor 12 in the compressor rack 14. For example, the identifying information includes a model number and a serial number of the compressor 12. The identifying module 2304 determines a plurality of operating characteristics of the compressor 12 based on the identification information. For example, the plurality of operating characteristics of the compressor 12 includes one or more of a type of modulation used by the compressor 12, a type of injection used by the compressor 12, a type of oil used by the compressor 12, one or more characteristics of a motor used by the compressor 12, and rating data of the compressor 12. The setup module 2306 configures or initializes the compressor 12 based on the plurality of operating characteristics of the compressor 12.

The power monitoring module 902 monitors the power consumption of the compressor 12 based on the plurality of operating characteristics of the compressor 12 as described above with reference to FIGS. 9A, 9B, and 10. The performance tracking module 904 tracks the performance of the compressor 12 based on the plurality of operating characteristics of the compressor 12 as described above with reference to FIGS. 11-14. The flood-back protection module 2102 calculates a discharge line temperature of the compressor 12 based on the plurality of operating characteristics of the compressor and provides flood-back protection to the compressor 12 as described above with reference to FIGS. 16A-16E.

The selecting module 2308 selects one or more controls (e.g., injection mode) to operate the compressor 12 based on the plurality of operating characteristics of the compressor 12. The transmitting module 2310 sends one or more of the identification information and operational data of the compressor 12 to a remote device (e.g., the remote controller 74 shown in FIG. 1). The receiving module 2302 receives data for controlling the compressor 12 from the remote device based on the one or more of the identification information and the operational data of the compressor 12 sent to the remote device. The system controller 70 controls the compressor 12 based on the data received from the remote device. The transmitting module also sends the identification information and operational data of the compressor to the remote device for diagnosing the compressor 12 and scheduling service for the compressor 12 from the remote device.

With reference to FIG. 17B, an example of a control algorithm 2350 for compressor identification is shown. For example, the control algorithm 2350 may be performed by the system controller 70 shown in FIG. 17A. The control algorithm 2350 starts at 2352.

At 2354, the receiving module 2302 receives identifying information from the compressor 12. At 2356, the identifying module 2304 determines operating characteristics of the compressor 12 based on the identifying information. At 2358, the setup module 2306 configures or initializes the compressor 12 based on the operating characteristics. At 2360, the selecting module 2308 select controls (e.g., injection mode) to operate the compressor 12 based on the operating characteristics.

At 2362, the power monitoring module 902 performs power monitoring, the performance tracking module 904 tracks performance, and the flood-back protection module 2102 provides flood-back protection for the compressor 12 based on the operating characteristics. At 2364, the transmitting module 2310 sends the identifying information and/or the operating characteristics of the compressor 12 to the remote controller 74. At 2366, the receiving module 2302 receives data for controlling the compressor 12 from the remote controller 74 and controls the compressor 12 based on the received data. At 2368, the remote controller 74 diagnoses the compressor 12 and schedules service for the compressor 12. The control algorithm 2350 ends at 2370.

In summary, the systems and methods described above provide and maintenance and diagnostics information for refrigeration systems. Specifically, the systems and methods can provide health indicators for each of the compressors 12 and other components of the refrigeration system 10 individually as well as for the entire the refrigeration system 10 as a whole. The systems and methods provide flood-back prediction and protection and bump start procedures for the refrigeration system 10. The systems and methods can predict a performance issue for the refrigeration system 10 based on future conditions. The systems and methods provide the ability to automatically setup the compressors 12 based on reading the compressor information.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
   a refrigeration or HVAC system having a compressor rack with at least one compressor, and
   a controller for the refrigeration or HVAC system, the controller having a performance tracking module configured to diagnose health of a compressor in the compressor rack,
   wherein in response to rated performance data for the compressor being unavailable, the performance tracking module is configured to generate baseline data for the compressor and to diagnose health of the compressor by comparing operational data of the compressor to the baseline data for the compressor; and
   wherein in response to the rated performance data for the compressor being available, the performance tracking module is configured to diagnose health of the compressor by comparing the operational data of the compressor to the rated performance data for the compressor.

2. The system of claim 1 wherein the performance tracking module comprises:

a baseline data module configured to generate the baseline data for the compressor based on data received from the compressor immediately following installation of compressor; and a monitoring module configured to diagnose health of the compressor by comparing the baseline data to the operational data of the compressor obtained subsequent to developing the baseline data.

3. The system of claim 1 wherein the performance tracking module comprises a regression-based monitoring module configured to:

perform a regression analysis on the rated performance data and the data obtained from the compressor during operation; and diagnose health of the compressor based on the regression analysis.

4. The system of claim 3 wherein the regression-based monitoring module comprises:

a benchmark generating module configured to generate a benchmark polynomial and a benchmark hull; and an analyzing module configured to analyze data obtained from the compressor during operation using the benchmark polynomial and the benchmark hull and to diagnose health of the compressor based on the analysis.

5. The system of claim 4 wherein the regression-based monitoring module comprises an optimizing module configured to:

select only statistically significant variables affecting a selected one of the rated performance data and to eliminate statistically insignificant variables; and optimize the benchmark polynomial using the selected variables.

6. The system of claim 4 wherein the regression-based monitoring module comprises an outlier detecting module configured to detect outliers in the data obtained from the compressor during operation and to remove outliers with largest deviation.

7. The system of claim 4 wherein the regression-based monitoring module comprises a comparing module configured to compare the benchmark polynomial and the benchmark hull with historical benchmark polynomial and hull data and to diagnose health of the compressor based on the comparison.

8. A method comprising:

controlling, with a controller, a refrigeration or HVAC system having a compressor rack with at least one compressor;

communicating with a performance tracking module configured to diagnose health of a compressor in the compressor rack;

in response to rated performance data for the compressor being unavailable, generating, with the performance tracking module, baseline data for the compressor and diagnosing health of the compressor by comparing operational data of the compressor to the baseline data for the compressor; and in response to the rated performance data for the compressor being available, diagnosing, with the performance tracking module, health of the compressor by comparing the operational data of the compressor to the rated performance data for the compressor.

9. The method of claim 8 further comprising:

generating, with a baseline data module, the baseline data for the compressor based on data received from the compressor immediately following installation of compressor; and diagnosing, with a monitoring module, health of the compressor by comparing the baseline data to the operational data of the compressor obtained subsequent to developing the baseline data.

10. The method of claim 8 further comprising:

performing, with a regression-based monitoring module, a regression analysis on the rated performance data and the data obtained from the compressor during operation; and diagnosing, with the regression-based monitoring module, health of the compressor based on the regression analysis.

11. The method of claim 10 further comprising:

generating, with a benchmark generating module, a benchmark polynomial and a benchmark hull; and analyzing, with an analyzing module, data obtained from the compressor during operation using the benchmark polynomial and the benchmark hull and diagnosing health of the compressor based on the analysis.

12. The method of claim 11 further comprising:

selecting, with an optimizing module, only statistically significant variables affecting a selected one of the rated performance data and eliminating statistically insignificant variables; and optimizing, with the optimizing module, the benchmark polynomial using the selected variables.

13. The method of claim 11 further comprising detecting, with an outlier detecting module, outliers in the data obtained from the compressor during operation and removing outliers with largest deviation.

14. The method of claim 11 further comprising comparing, with a comparing module, the benchmark polynomial and the benchmark hull with historical benchmark polynomial and hull data and diagnosing health of the compressor based on the comparison.

\* \* \* \* \*